United States Patent
Chen et al.

(10) Patent No.: US 12,470,697 B2
(45) Date of Patent: Nov. 11, 2025

(54) LOCAL ILLUMINATION COMPENSATION WITH MULTIPLE LINEAR MODELS

(71) Applicant: InterDigital CE Patent Holdings, SAS, Paris (FR)

(72) Inventors: Ya Chen, Rennes (FR); Philippe Bordes, Laillé (FR); Antoine Robert, Mézières sur Couesnon (FR); Karam Naser, Mouazé (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 18/722,307

(22) PCT Filed: Dec. 19, 2022

(86) PCT No.: PCT/EP2022/086589
§ 371 (c)(1),
(2) Date: Jun. 20, 2024

(87) PCT Pub. No.: WO2023/117861
PCT Pub. Date: Jun. 29, 2023

(65) Prior Publication Data
US 2024/0388691 A1    Nov. 21, 2024

(30) Foreign Application Priority Data
Dec. 21, 2021 (EP) .................... 21306875

(51) Int. Cl.
*H04N 7/12* (2006.01)
*H04N 19/105* (2014.01)
(Continued)

(52) U.S. Cl.
CPC ......... *H04N 19/105* (2014.11); *H04N 19/132* (2014.11); *H04N 19/167* (2014.11); *H04N 19/176* (2014.11); *H04N 19/196* (2014.11)

(58) Field of Classification Search
CPC ...................................... H04N 19/70
See application file for complete search history.

(56) References Cited

FOREIGN PATENT DOCUMENTS

| CN | 111031319 A | 4/2020 |
|---|---|---|
| WO | 2020/251930 A1 | 12/2020 |
| WO | 2021/032171 A1 | 2/2021 |

OTHER PUBLICATIONS

Chen et al., "Algorithm Description for Versatile Video Coding and Test Model 11 (VTM 11)", JVET-T2002-v2, Editors, Joint Video Experts Team (JVET) of ITU-T SG 16 WP 3 and ISO/IEC JTC 1/SC 29, 20th Meeting, by teleconference, Oct. 7-16, 2020, pp. 1-101.

(Continued)

*Primary Examiner* — Y Lee
(74) *Attorney, Agent, or Firm* — Condo Roccia Koptiw LLP

(57) ABSTRACT

Systems, methods, and instrumentalities are disclosed for performing local illumination compensation (LIC) with multiple linear models. In an example, a device, such as a video decoding device, or a video encoding device, may determine that sub-partition-based local illumination compensation (sub-LIC) is enabled for a current block. The device may divide the current block into a plurality of sub-partitions. The device may identify a plurality of templates associated with the plurality of sub-partitions. The device may derive a plurality of local illumination compensation (LIC) parameter sets associated with the plurality of sub-partitions based on the plurality of templates associated with the plurality of sub-partitions. The device may process (e.g., encode and/or decode) the current block based on the plurality of LIC parameter sets.

20 Claims, 23 Drawing Sheets

(51) Int. Cl.
*H04N 19/132* (2014.01)
*H04N 19/167* (2014.01)
*H04N 19/176* (2014.01)
*H04N 19/196* (2014.01)

(56) References Cited

OTHER PUBLICATIONS

Seregin et al., "CE4-3.1a and CE4-3.1b: Unidirectional Local Illumination Compensation with Affine Prediction", JVET-O0066-v1, Qualcomm Incorporated, MediaTek Inc, Huawei Technologies. Co., Ltd., Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-5.

Zhang et al., "Enhanced Cross-Component Linear Model Intra-Prediction", JVET-D0110, Qualcomm Incorporated, Joint Video Exploration Team (JVET) of ITU-T SG 16 WP 3 and ISO/IEC JTC 1/SC 29/WG 11, 4th Meeting: Chengdu, CN, Oct. 15-21, 2016, 5 pages.

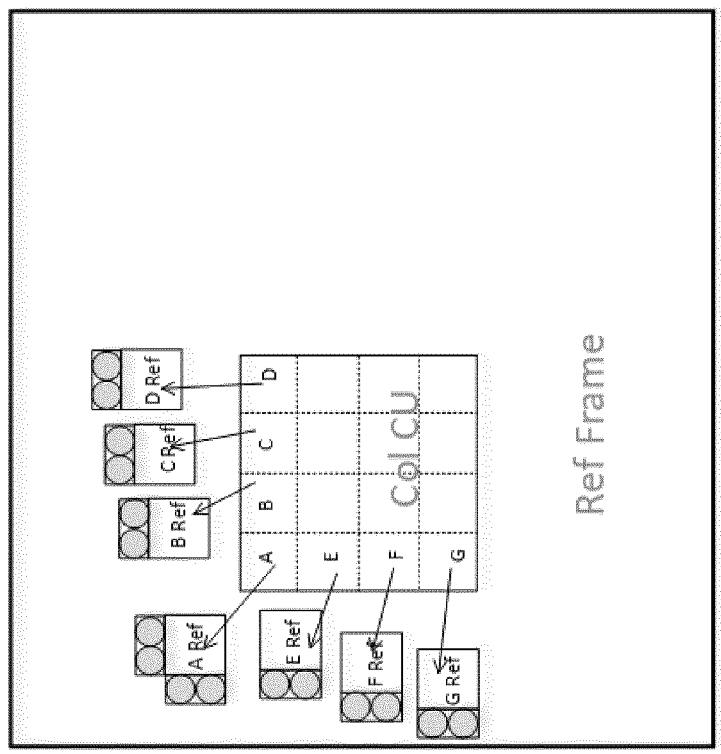
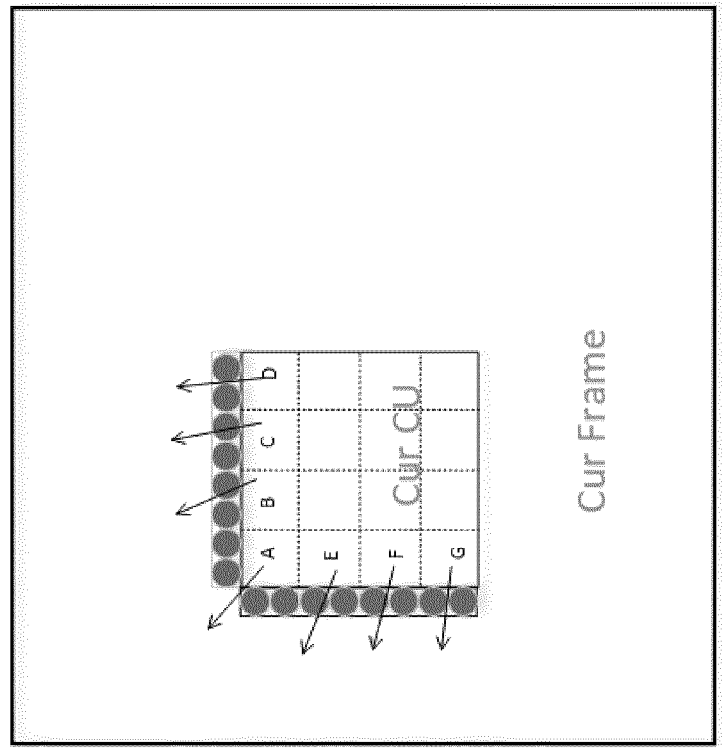
FIG. 6

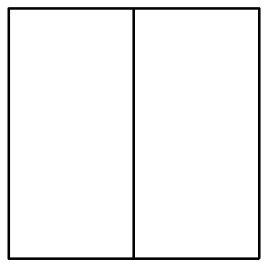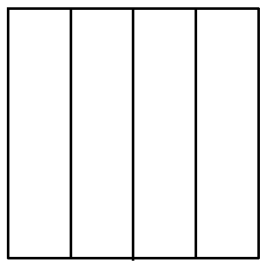
FIG. 15

LOCAL ILLUMINATION COMPENSATION WITH MULTIPLE LINEAR MODELS

CROSS-REFERENCE TO RELATED APPLICATIONS

This application is the National Stage Entry under 35 U.S.C. § 371 of Patent Cooperation Treaty Application No. PCT/EP2022/086589, filed Dec. 19, 2022, which claims the benefit of European Provisional Patent Application No. EP 21306875.2, filed Dec. 21, 2021, the contents of which are incorporated by reference herein.

BACKGROUND

Video coding systems may be used to compress digital video signals, e.g., to reduce the storage and/or transmission bandwidth needed for such signals. Video coding systems may include, for example, block-based, wavelet-based, and/or object-based systems.

SUMMARY

Systems, methods, and instrumentalities may be provided for performing local illumination compensation (LIC) with multiple linear models. In an example, a device, such as a video decoding device, or a video encoding device, may determine that sub-partition-based local illumination compensation (sub-LIC) is enabled for a current block. The device may divide the current block into a plurality of sub-partitions. The device may identify templates associated with the sub-partitions. The device may derive multiple local illumination compensation (LIC) parameter sets associated with the sub-partitions based on the templates associated with the sub-partitions. The device may process (e.g., encode and/or decode) the current block based on the LIC parameter sets.

A sub-LIC enablement indicator configured to indicate whether sub-LIC is enabled for the current block may be obtained. That sub-LIC is enabled for the current block may be determined based on the sub-LIC enablement indicator indicating that sub-LIC is enabled for the current block.

Whether a sub-LIC direction indication is included in video data may be determined based on a sub-LIC enablement indicator. Based on the sub-LIC enablement indicator indicating that sub-LIC is enabled, the sub-LIC direction indication may be obtained from the video data, and the current block may be divided into sub-partitions based on the sub-LIC direction indication.

In an example, the current block may be divided vertically. A first template may correspond to a left sub-partition of the current block, and the first template may include reconstructed samples neighboring the left border and the top border of the left sub-partition of the current block. A second template may correspond to a right sub-partition of the current block, and the second template may include reconstructed samples neighboring the top border of the right sub-partition of the current block. An LIC parameter set may be derived based on the first template, and another LIC parameter set may be derived based on a second template. The current block may be encoded and/or decoded based on the two LIC parameter sets.

In an example, the current block may be divided horizontally. A first template may correspond to a top sub-partition of the current block, and the first template may include reconstructed samples neighboring the left border and the top border of the top sub-partition of the current block. A second template may correspond to a bottom sub-partition of the current block, and the second template may include reconstructed samples neighboring the left border of the bottom sub-partition of the current block. An LIC parameter set may be derived based on the first template, and another LIC parameter set may be derived based on a second template. The current block may be encoded and/or decoded based on the two LIC parameter sets.

For example, the sub-partitions may include a first sub-partition and a second sub-partition. For example, a first template associated with the first sub-partition may be identified by the device. A first LIC parameter set for a first sub-partition may be derived based on a first template associated with the first sub-partition. A second template associated with the second sub-partition may be identified by the device. A second LIC parameter set for a second sub-partition may be derived by the device based on the second template associated with the second sub-partition.

In an example, the first LIC parameter set may be applied on a reference block of the current block to obtain a first prediction block of the current block. The second LIC parameter set may be applied on a reference block of the current block to obtain a second prediction block of the current block. The current block may be processed (e.g., encoded and/or decoded) based on the first prediction block and the second prediction block.

In an example, the first LIC parameter set may be applied on the reference samples of the first sub-partition to obtain the prediction samples of the first sub-partition. The second LIC parameter set may be applied on the reference samples of the second sub-partition to obtain the prediction samples of the second sub-partition. A prediction block of the current block may be obtained by combining the prediction samples of the first sub-partition and the prediction samples of the second sub-partition. The current block may be processed (e.g., encoded and/or decoded) based on the prediction block.

In an example, a first LIC parameter set may be applied on a first sub-partition of a reference block of the current block to obtain a first prediction block of the current block. A second LIC parameter set may be applied on a second sub-partition of the reference block of the current block to obtain a second prediction block of the current block. The first prediction block and the second prediction block may be combined for processing (e.g., encoding and/or decoding) the current block.

In an example, a LIC parameter set may include a scaling factor and an offset. For example, the scaling factor and the offset may be applied to a reference block of the current block to obtain a prediction block, and the current block may be processed (e.g., encoded and/or decoded) based on the prediction block.

Systems, methods, and instrumentalities described herein may involve a decoder. In some examples, the systems, methods, and instrumentalities described herein may involve an encoder. In some examples, the systems, methods, and instrumentalities described herein may involve a signal (e.g., from an encoder and/or received by a decoder). A computer-readable medium may include instructions for causing one or more processors to perform methods described herein. A computer program product may include instructions which, when the program is executed by one or more processors, may cause the one or more processors to carry out the methods described herein.

BRIEF DESCRIPTION OF THE DRAWINGS

FIG. 6 shows an example derivation of LIC parameters based on template samples associated with sub-blocks.

FIG. 15 shows an example of an inter-predicted block divided vertically or horizontally into symmetrical sub-partitions.

DETAILED DESCRIPTION

Figure 1A:
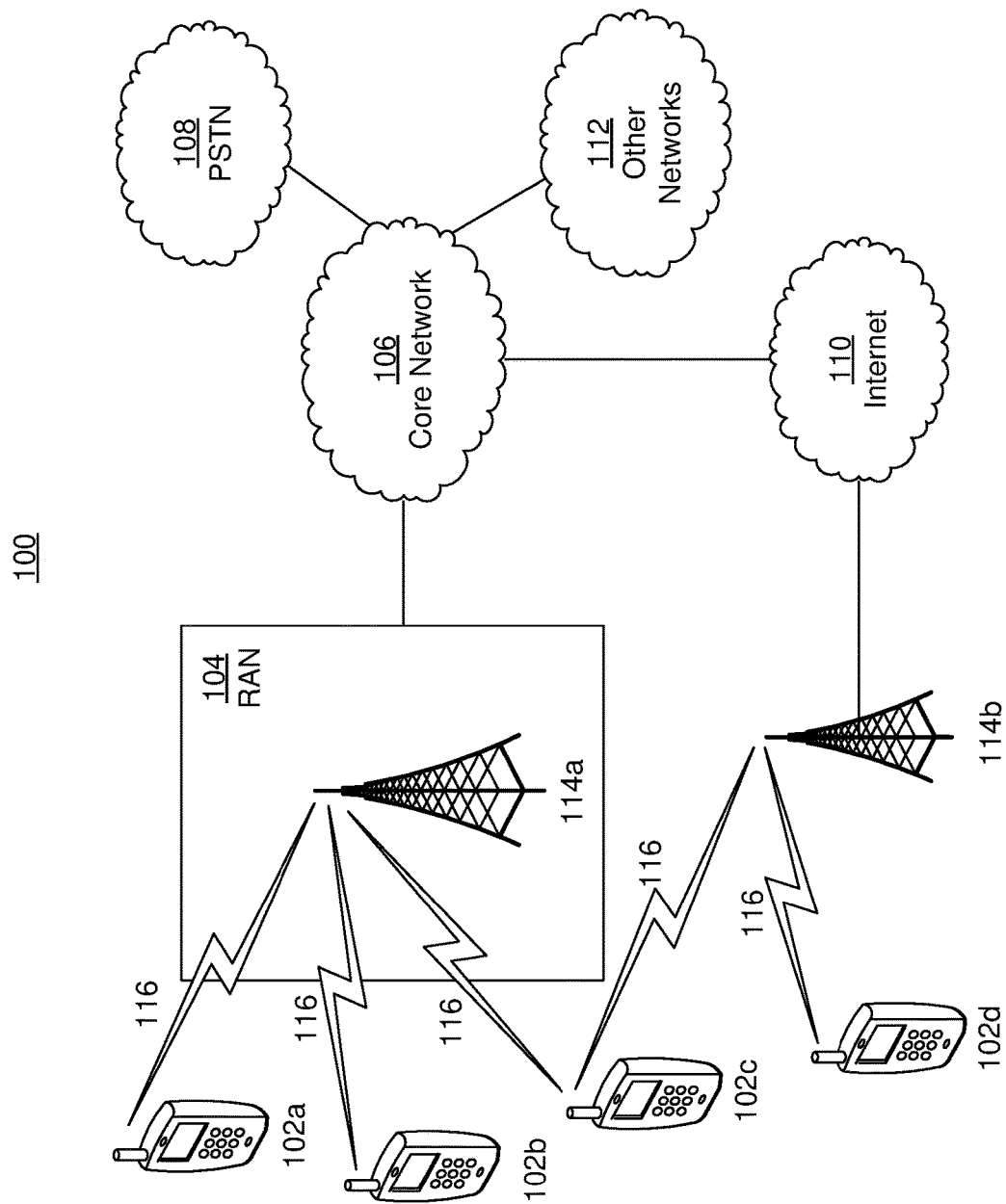
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
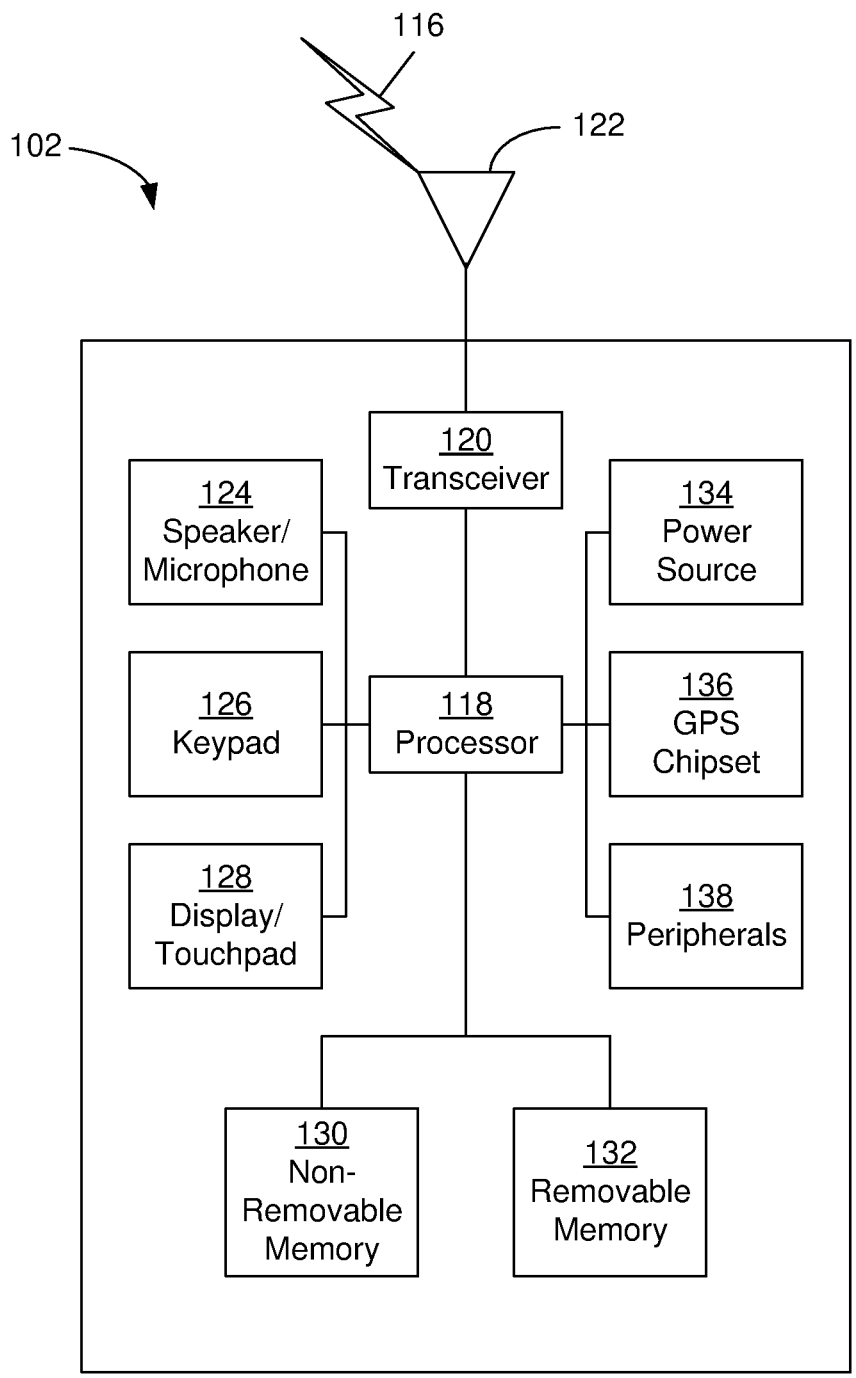
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
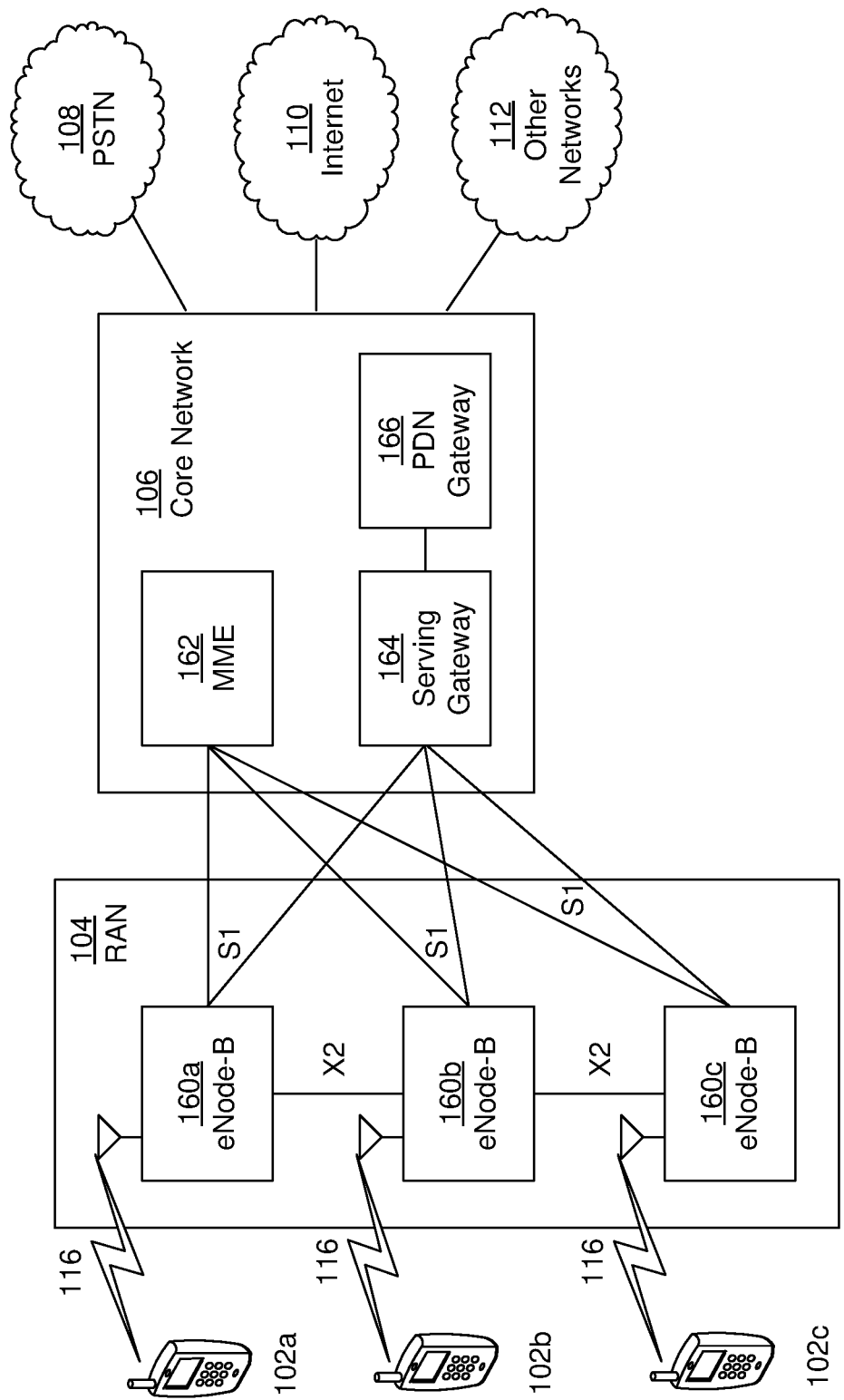
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
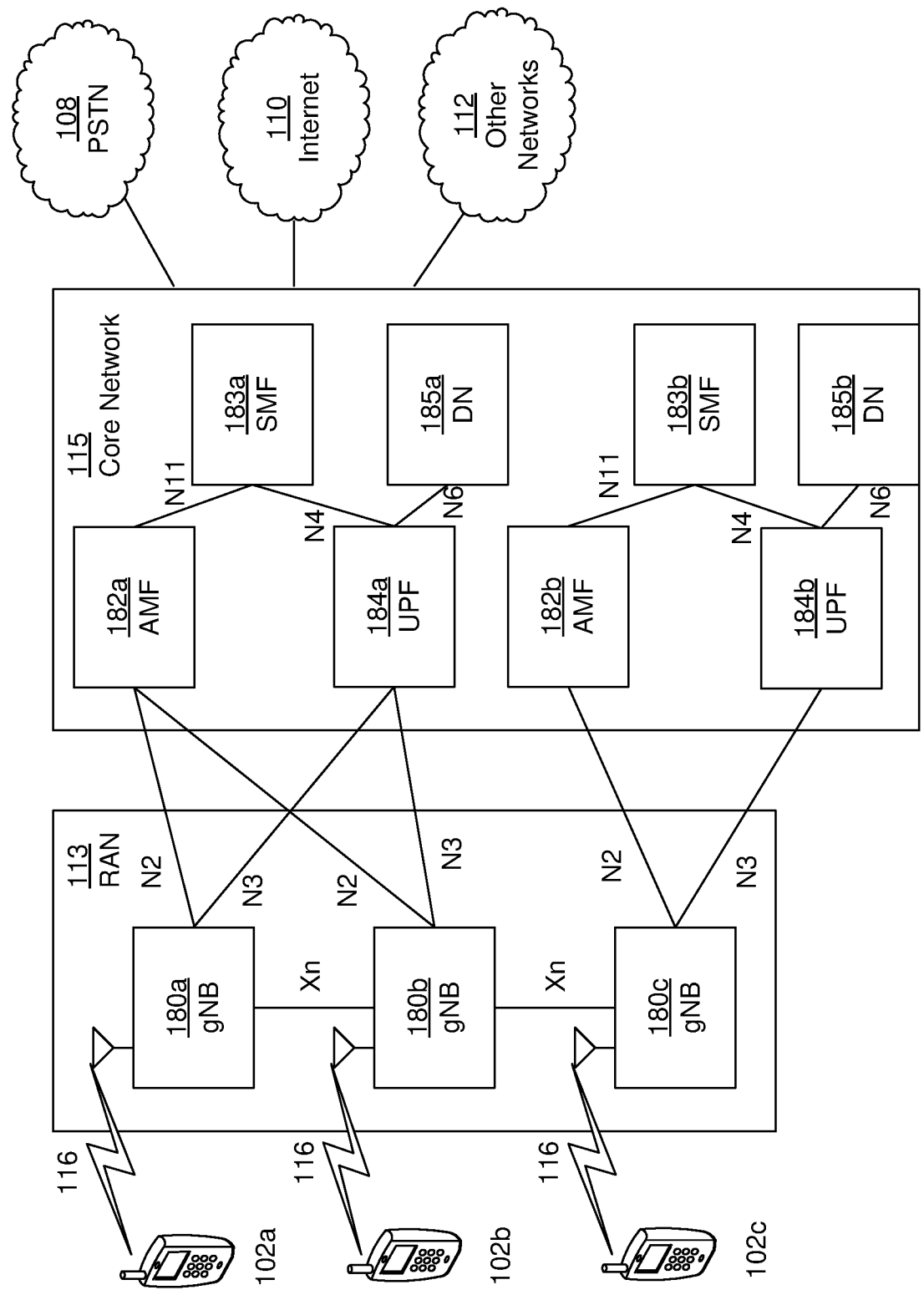
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a*-*d*, Base Station 114*a*-*b*, eNode-B 160*a*-*c*, MME 162, SGW 164, PGW 166, gNB 180*a*-*c*, AMF 182*a*-*b*, UPF 184*a*-*b*, SMF 183*a*-*b*, DN 185*a*-*b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

This application describes a variety of aspects, including tools, features, examples, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects may be combined and interchanged to provide further aspects. Moreover, the aspects may be combined and interchanged with aspects described in earlier filings as well.

The aspects described and contemplated in this application may be implemented in many different forms. FIGS. 5-20 described herein may provide examples, and other examples are contemplated. The discussion of FIGS. 5-20 does not limit the breadth of the implementations. At least one of the aspects generally relates to video encoding and decoding, and at least one other aspect generally relates to transmitting a bitstream generated or encoded. These and other aspects may be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various examples to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Figure 2:
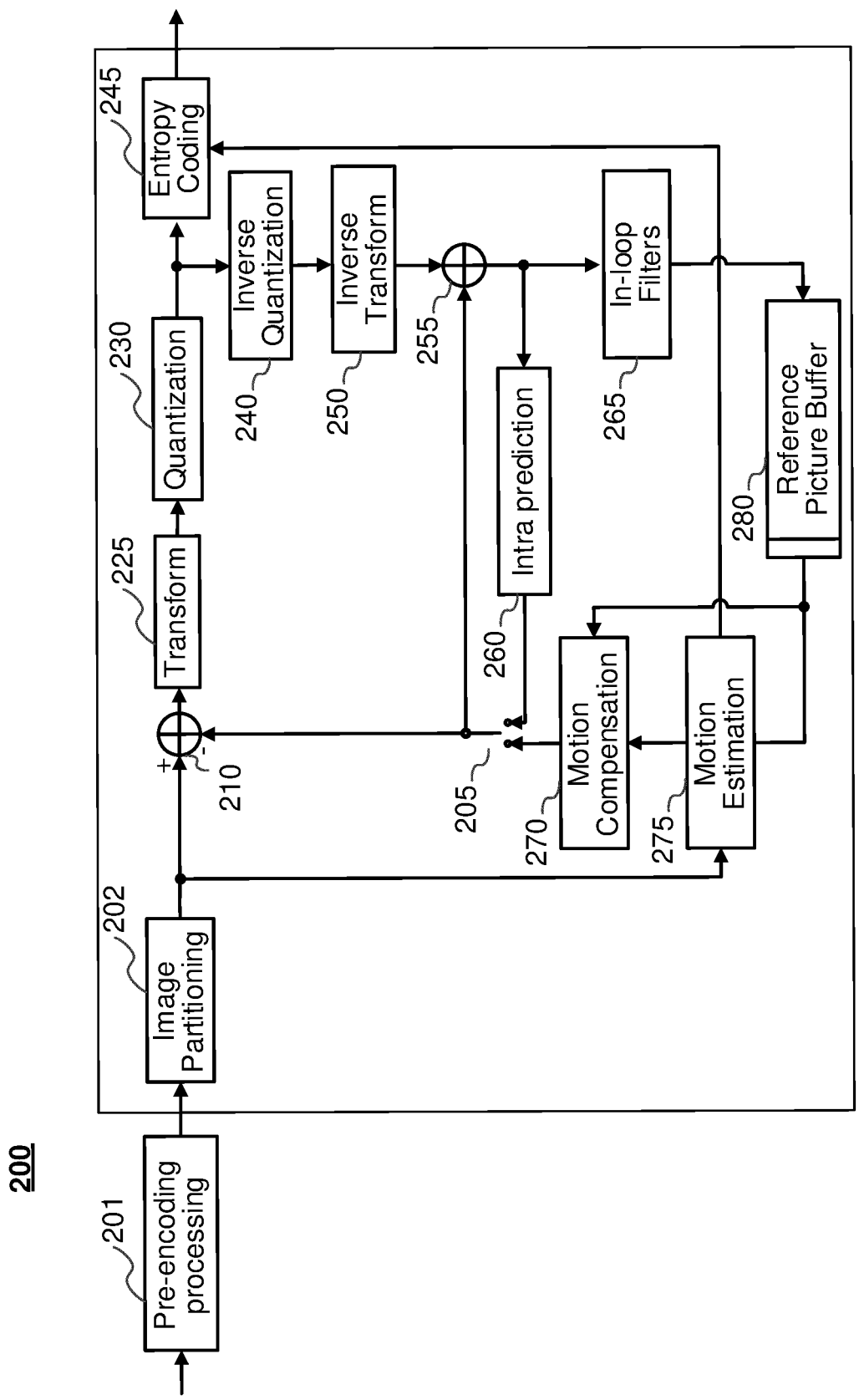
FIG. 2 illustrates an example video encoder.
Figure 3:
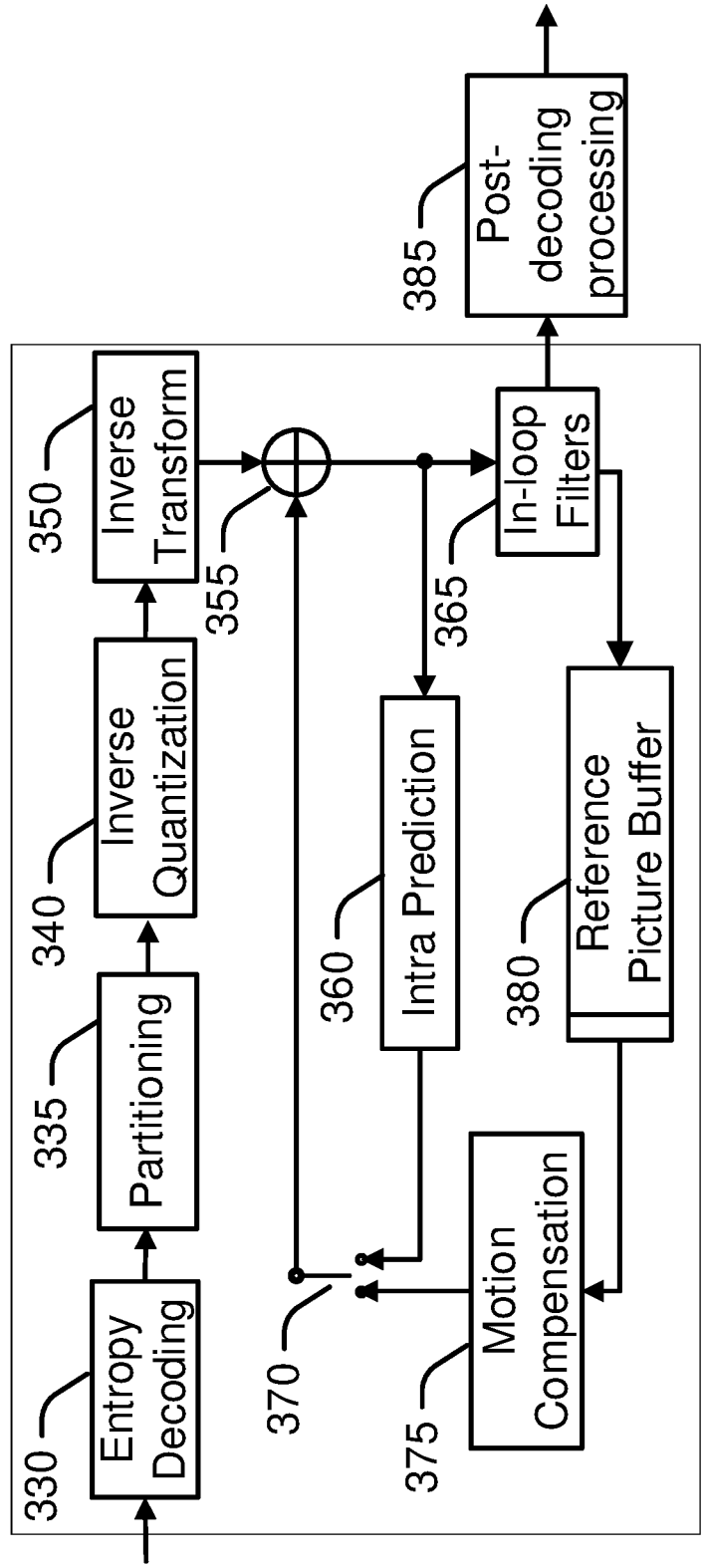
FIG. 3 illustrates an example video decoder.

Various methods and other aspects described in this application may be used to modify modules, for example, decoding modules, of a video encoder 200 and decoder 300 as shown in FIG. 2 and FIG. 3. Moreover, the subject matter disclosed herein may be applied, for example, to any type, format or version of video coding, whether described in a standard or a recommendation, whether pre-existing or future-developed, and extensions of any such standards and recommendations. Unless indicated otherwise, or technically precluded, the aspects described in this application may be used individually or in combination.

Various numeric values are used in examples described the present application, such as 1, 2, 4, 8, 16, 24, 32, etc. These and other specific values are for purposes of describing examples and the aspects described are not limited to these specific values.

FIG. 2 is a diagram showing an example video encoder. Variations of example encoder 200 are contemplated, but the encoder 200 is described below for purposes of clarity without describing all expected variations.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata may be associated with the pre-processing, and attached to the bitstream.

In the encoder 200, a picture is encoded by the encoder elements as described below. The picture to be encoded is partitioned (202) and processed in units of, for example, coding units (CUs). Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

FIG. 3 is a diagram showing an example of a video decoder. In example decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which may be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g., conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream. In an example, the decoded images (e.g., after application of the in-loop filters (365) and/or after post-decoding processing (385), if post-decoding processing is used) may be sent to a display device for rendering to a user.

Figure 4:
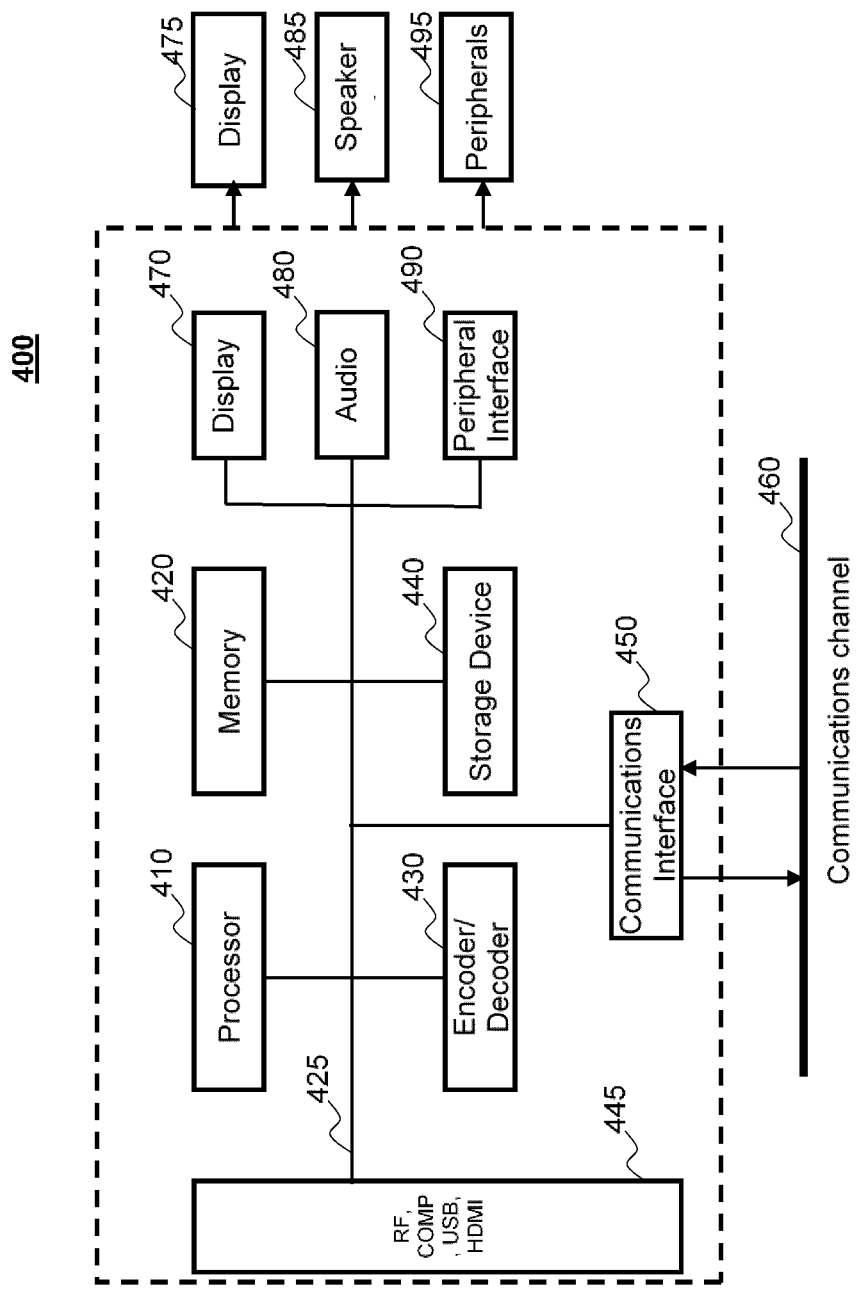
FIG. 4 illustrates an example of a a system in which various aspects and examples may be implemented.

FIG. 4 is a diagram showing an example of a system in which various aspects and examples described herein may be implemented. System 400 may be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 400, singly or in combination, may be embodied in a single integrated circuit (IC), multiple ICs, and/or discrete components. For example, in at least one example, the processing and encoder/decoder elements of system 400 are distributed across multiple ICs and/or discrete components. In various examples, the system 400 is communicatively coupled to one or more other systems, or other electronic devices, via, for example, a communications bus or through dedicated input and/or output ports. In various examples, the system 400 is configured to implement one or more of the aspects described in this document.

The system 400 includes at least one processor 410 configured to execute instructions loaded therein for implementing, for example, the various aspects described in this document. Processor 410 can include embedded memory, input output interface, and various other circuitries as known in the art. The system 400 includes at least one memory 420 (e.g., a volatile memory device, and/or a non-volatile memory device). System 400 includes a storage device 440, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 440 can include an internal storage device, an attached storage device (including detachable and non-detachable storage devices), and/or a network accessible storage device, as non-limiting examples.

System 400 includes an encoder/decoder module 430 configured, for example, to process data to provide an encoded video or decoded video, and the encoder/decoder module 430 can include its own processor and memory. The encoder/decoder module 430 represents module(s) that may be included in a device to perform the encoding and/or decoding functions. As is known, a device can include one or both of the encoding and decoding modules. Additionally, encoder/decoder module 430 may be implemented as a separate element of system 400 or may be incorporated within processor 410 as a combination of hardware and software as known to those skilled in the art.

Program code to be loaded onto processor 410 or encoder/decoder 430 to perform the various aspects described in this document may be stored in storage device 440 and subsequently loaded onto memory 420 for execution by processor 410. In accordance with various examples, one or more of processor 410, memory 420, storage device 440, and encoder/decoder module 430 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some examples, memory inside of the processor 410 and/or the encoder/decoder module 430 is used to store instructions and to provide working memory for processing that is needed during encoding or decoding. In other examples, however, a memory external to the processing device (for example, the processing device may be either the processor 410 or the encoder/decoder module 430) is used for one or more of these functions. The external memory may be the memory 420 and/or the storage device 440, for example, a dynamic volatile memory and/or a non-volatile flash memory. In several examples, an external non-volatile flash memory is used to store the operating system of, for example, a television. In at least one example, a fast external dynamic volatile memory such as a RAM is used as working memory for video encoding and decoding operations.

The input to the elements of system 400 may be provided through various input devices as indicated in block 445. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 4, include composite video.

In various examples, the input devices of block 445 have associated respective input processing elements as known in the art. For example, the RF portion may be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain examples, (iv) demodulating the down-converted and band-limited signal, (v) performing error correction, and/or (vi) demultiplexing to select the desired stream of data packets. The RF portion of various examples includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box example, the RF portion and its associated input processing element receives an RF signal transmitted over a wired (for example, cable) medium, and performs frequency selection by filtering, down-converting, and filtering again to a desired frequency band. Various examples rearrange the order of the above-described (and other) elements, remove some of these elements, and/or add other elements performing similar or different functions. Adding elements can include inserting elements in between existing elements, such as, for example, inserting amplifiers and an analog-to-digital converter. In various examples, the RF portion includes an antenna.

The USB and/or HDMI terminals can include respective interface processors for connecting system 400 to other electronic devices across USB and/or HDMI connections. It is to be understood that various aspects of input processing, for example, Reed-Solomon error correction, may be implemented, for example, within a separate input processing IC or within processor 410 as necessary. Similarly, aspects of USB or HDMI interface processing may be implemented within separate interface ICs or within processor 410 as necessary. The demodulated, error corrected, and demultiplexed stream is provided to various processing elements, including, for example, processor 410, and encoder/decoder 430 operating in combination with the memory and storage elements to process the datastream as necessary for presentation on an output device.

Various elements of system 400 may be provided within an integrated housing, Within the integrated housing, the various elements may be interconnected and transmit data therebetween using suitable connection arrangement 425, for example, an internal bus as known in the art, including the Inter-IC (I2C) bus, wiring, and printed circuit boards.

The system 400 includes communication interface 450 that enables communication with other devices via communication channel 460. The communication interface 450 can include, but is not limited to, a transceiver configured to transmit and to receive data over communication channel 460. The communication interface 450 can include, but is not limited to, a modem or network card and the communication channel 460 may be implemented, for example, within a wired and/or a wireless medium.

Data is streamed, or otherwise provided, to the system 400, in various examples, using a wireless network such as a Wi-Fi network, for example IEEE 802.11 (IEEE refers to the Institute of Electrical and Electronics Engineers). The Wi-Fi signal of these examples is received over the communications channel 460 and the communications interface 450 which are adapted for Wi-Fi communications. The communications channel 460 of these examples is typically connected to an access point or router that provides access to external networks including the Internet for allowing streaming applications and other over-the-top communications. Other examples provide streamed data to the system 400 using a set-top box that delivers the data over the HDMI connection of the input block 445. Still other examples provide streamed data to the system 400 using the RF connection of the input block 445. As indicated above, various examples provide data in a non-streaming manner. Additionally, various examples use wireless networks other than Wi-Fi, for example a cellular network or a Bluetooth® network.

The system 400 can provide an output signal to various output devices, including a display 475, speakers 485, and other peripheral devices 495. The display 475 of various examples includes one or more of, for example, a touch-screen display, an organic light-emitting diode (OLED) display, a curved display, and/or a foldable display. The display 475 may be for a television, a tablet, a laptop, a cell phone (mobile phone), or other device. The display 475 can also be integrated with other components (for example, as in a smart phone), or separate (for example, an external monitor for a laptop). The other peripheral devices 495 include, in various examples, one or more of a stand-alone digital video disc (or digital versatile disc) (DVD, for both terms), a disk player, a stereo system, and/or a lighting system. Various examples use one or more peripheral devices 495 that provide a function based on the output of the system

400. For example, a disk player performs the function of playing the output of the system 400.

In various examples, control signals are communicated between the system 400 and the display 475, speakers 485, or other peripheral devices 495 using signaling such as AV.Link, Consumer Electronics Control (CEC), or other communications protocols that enable device-to-device control with or without user intervention. The output devices may be communicatively coupled to system 400 via dedicated connections through respective interfaces 470, 480, and 490. Alternatively, the output devices may be connected to system 400 using the communications channel 460 via the communications interface 450. The display 475 and speakers 485 may be integrated in a single unit with the other components of system 400 in an electronic device such as, for example, a television. In various examples, the display interface 470 includes a display driver, such as, for example, a timing controller (T Con) chip.

The display 475 and speakers 485 can alternatively be separate from one or more of the other components, for example, if the RF portion of input 445 is part of a separate set-top box. In various examples in which the display 475 and speakers 485 are external components, the output signal may be provided via dedicated output connections, including, for example, HDMI ports, USB ports, or COMP outputs.

The examples may be carried out by computer software implemented by the processor 410 or by hardware, or by a combination of hardware and software. As a non-limiting example, the examples may be implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various examples, such processes include one or more of the processes typically performed by a decoder, for example, entropy decoding, inverse quantization, inverse transformation, and differential decoding. In various examples, such processes also, or alternatively, include processes performed by a decoder of various implementations described in this application, for example, determining that sub-partition-based local illumination compensation (sub-LIC) is enabled for a current block, dividing the current block into a plurality of sub-partitions, identifying a plurality of templates associated with the plurality of sub-partitions, deriving a plurality of local illumination compensation (LIC) parameter sets associated with the plurality of sub-partitions based on the plurality of templates associated with the plurality of sub-partitions, and decoding the current block based on the plurality of LIC parameter sets, etc.

As further examples, in one example "decoding" refers only to entropy decoding, in another example "decoding" refers only to differential decoding, and in another example "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various examples, such processes include one or more of the processes typically performed by an encoder, for example, partitioning, differential encoding, transformation, quantization, and entropy encoding. In various examples, such processes also, or alternatively, include processes performed by an encoder of various implementations described in this application, for example, determining to enable sub-partition-based local illumination compensation (sub-LIC) for a current block, dividing the current block into a plurality of sub-partitions, identifying a plurality of templates associated with the plurality of sub-partitions, deriving a plurality of local illumination compensation (LIC) parameter sets associated with the plurality of sub-partitions based on the plurality of templates associated with the plurality of sub-partitions, and encoding the current block based on the plurality of LIC parameter sets, etc.

As further examples, in one example "encoding" refers only to entropy encoding, in another example "encoding" refers only to differential encoding, and in another example "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that syntax elements as used herein, for example, coding syntax on partitioning, sub-partitioning, local illumination compensation (LIC), sub-partition-based local illumination compensation (sub-LIC), sub-LIC direction(s), flag(s), etc., are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein may be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus may be implemented in, for example, appropriate hardware, software, and firmware. The methods may be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one example" or "an example" or "one implementation" or "an implementation", as well as other variations thereof, means that a particular feature, structure, characteristic, and so forth described in connection with the example is included in at least one example. Thus, the appearances of the phrase "in one example" or "in an example" or "in one implementation" or "in an implementation", as well any other variations, appearing in various places throughout this application are not necessarily all referring to the same example.

Additionally, this application may refer to "determining" various pieces of information. Determining the information can include one or more of, for example, estimating the information, calculating the information, predicting the information, or retrieving the information from memory. Obtaining may include receiving, retrieving, constructing, generating, and/or determining.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. Encoder signals may include, for example, picture partitioning information, flag, etc. In this way, in an example the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various examples. It is to be appreciated that signaling may be accomplished in a variety of ways. For example, one or more syntax elements, flags, and so forth are used to signal information to a corresponding decoder in various examples. While the preceding relates to the verb form of the word "signal," the word "signal" can also be used herein as a noun.

As will be evident to one of ordinary skill in the art, implementations may produce a variety of signals formatted to carry information that may be, for example, stored or transmitted. The information can include, for example, instructions for performing a method, or data produced by one of the described implementations. For example, a signal may be formatted to carry the bitstream of a described example. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on, or accessed or received from, a processor-readable medium.

Many examples are described herein. Features of examples may be provided alone or in any combination, across various claim categories and types. Further, examples may include one or more of the features, devices, or aspects described herein, alone or in any combination, across various claim categories and types. For example, features described herein may be implemented in a bitstream or signal that includes information generated as described herein. The information may allow a decoder to decode a bitstream, the encoder, bitstream, and/or decoder according to any of the embodiments described. For example, features described herein may be implemented by creating and/or transmitting and/or receiving and/or decoding a bitstream or signal. For example, features described herein may be implemented a method, process, apparatus, medium storing instructions, medium storing data, or signal. For example, features described herein may be implemented by a TV, set-top box, cell phone, tablet, or other electronic device that performs decoding. The TV, set-top box, cell phone, tablet, or other electronic device may display (e.g., using a monitor, screen, or other type of display) a resulting image (e.g., an image from residual reconstruction of the video bitstream). The TV, set-top box, cell phone, tablet, or other electronic device may receive a signal including an encoded image and perform decoding.

Multiple linear models may be used to compensate for the temporal illumination discrepancy. Multiple linear models may be derived between the neighboring block of a current block and the neighboring block of its reference block and may be used to generate the prediction of the current block with illumination compensation. Compression efficiency may be improved, for example, by reducing the bitrate while maintaining the quality or by improving the quality while maintaining the bitrate.

Local illumination compensation (LIC) may be performed. In examples, LIC may be used to address local illumination changes that exist between temporal neighboring pictures. LIC may be based on a linear model where a scaling factor $\alpha$ and an offset $\beta$ are applied to reference samples to obtain prediction samples of a current block. For example, LIC may be mathematically modeled by the following equation:

$$P(x, y) = \alpha \times P_r(x + v_x, y + v_y) + \beta \quad (1)$$

where P(x, y) may be a prediction signal of the current block at the coordinate (x, y); $P_r(x+v_x, y+v_y)$ may be the reference block pointed by the motion vector $(v_x, v_y)$; and $\alpha$ and $\beta$ may be the corresponding scaling factor and offset that are applied to the reference block.

Figure 5:
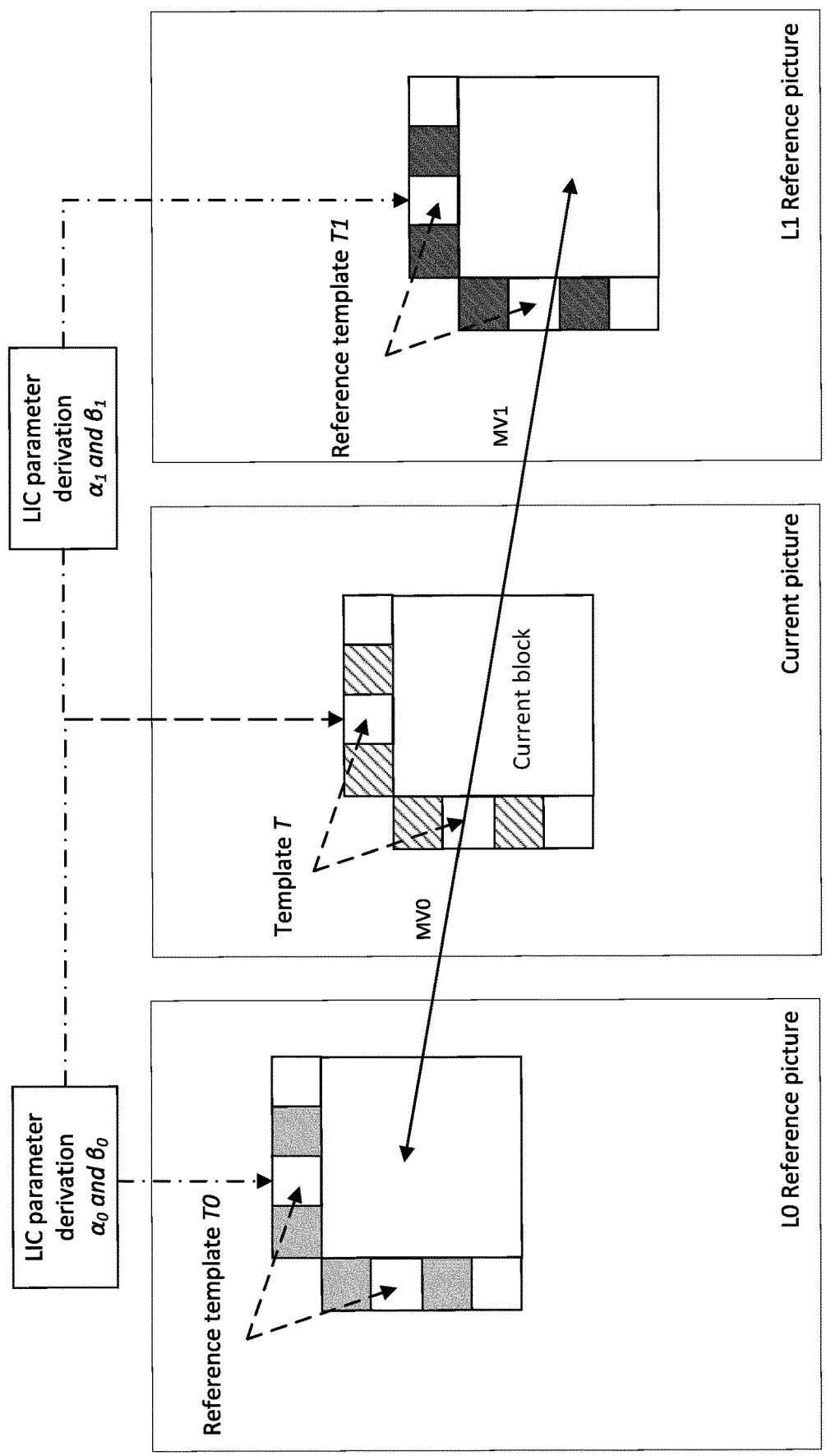
FIG. 5 shows a local illumination compensation (LIC) parameter estimations process.

FIG. 5 shows an LIC parameter estimations process. As shown in FIG. 5, if the LIC is applied for a block, a Least-Mean-Square-Error (LMSE) may be employed to derive the values of the LIC parameters (e.g., $\alpha$ and $\beta$) by minimizing the difference between the reconstructed neighboring samples, e.g., in a left column and an above row, of the current block (e.g., the template T as shown in FIG. 5) and their corresponding neighboring samples in the reference blocks of the current block (e.g., $T_0$ or $T_1$ as shown in FIG. 5):

$$\alpha = \frac{N \times \sum_{i=1}^{N} T(x_i, y_i) \times T_{0/1}(x_i + v_x^{0/1}, y_i + v_y^{0/1}) - \sum_{i=1}^{N} T(x_i, y_i) \times \sum_{i=1}^{N} T_{0/1}(x_i + v_x^{0/1}, y_i + v_y^{0/1})}{N \times \sum_{i=1}^{N} T_{0/1}(x_i + v_x^{0/1}, y_i + v_y^{0/1}) \times T_{0/1}(x_i + v_x^{0/1}, y_i + v_y^{0/1}) - \left(\sum_{i=1}^{N} T_{0/1}(x_i + v_x^{0/1}, y_i + v_y^{0/1})\right)^2} \quad (2)$$

$$\beta = \frac{\sum_{i=1}^{N} T(x_i, y_i) - \alpha \times \sum_{i=1}^{N} T_{0/1}(x_i + v_x^{0/1}, y_i + v_y^{0/1})}{N} \quad (3)$$

where N may represent the number of template samples used for deriving the LIC parameters; $T(x_i, y_i)$ may be the template sample of the current block at the coordinate $(x_i, y_i)$; $T_{0/1}(x_i+v_x^{0/1}, y_i+v_y^{0/1})$ may be the corresponding reference sample of the template sample based on the motion vector $(v_x^{0/1}, v_y^{0/1})$ (e.g., L0 or L1) of the current block. In examples, to reduce the computational complexity, both the template samples and the reference template samples may be subsampled (e.g., 2:1 subsampling) to derive the LIC parameters for a block size larger than 8, (e.g., the shaded samples shown in FIG. 5 may be used to derive $\alpha$ and $\beta$).

LIC may be applied to blocks coded with sub-block mode (e.g., affine), for example, where LIC parameters may be derived based on the template samples derived on a sub-block basis (e.g., as shown in FIG. 6).

FIG. 6 illustrates an example derivation of LIC parameters based on template samples associated with sub-blocks. The reference samples in the top template may be fetched by the sub-block motion vectors (MVs) in the top row and the reference samples in the left template may be fetched by the sub-block MVs in the left column. The LIC parameters $\alpha$ and $\beta$ may be derived based on a current block template T and a reference block template $T_{0/1}$ at an encoder and decoder.

If an inter block is predicted with merge mode, the LIC flag may be included as a part of motion information, for example, in addition to motion vector predictors (MVPs) and reference indices. When a merge candidate list is constructed, the LIC flag may be inherited from the neighboring blocks for merge candidates (e.g., for determining merge candidates). In examples, the LIC flag may be context-coded with an (e.g., single) context (e.g., if the LIC tool is not applicable, the LIC flag may not be signaled).

In examples, the LIC may be applied to both luma and chroma components with one or more of the following configurations: disable for combined inter/intra prediction (CIP) and intra block copy (IBC) blocks; disable LIC for blocks with less than 32 luma samples; no temporal inheritance of an LIC flag; no pruning based on an LIC flag in a merging candidate list generation; not applied to bi-prediction; and/or samples of the reference block template are generated using motion compensation (MC) with the block MV without rounding the block MV to integer-pel precision.

Multi-model linear model (MMLM) may be used. Cross-component linear model (CCLM) chroma intra prediction may explore the relationship between the luma and chroma components. For example, the chroma samples may be predicted based on the reconstructed luma samples of the same coding unit (CU) by using a linear model as follows:

$$Pred_C(x, y) = \alpha \times Rec'_L(x, y) + \beta \quad (4)$$

where $Pred_C(x, y)$ may represent the predicted chroma samples in a CU at the coordinate (x, y); $Rec_L'(x, y)$ may represent the down-sampled reconstructed luma samples of the same CU. Parameters $\alpha$ and $\beta$ may be derived from the reconstructed samples neighboring the current block.

LMSE between neighboring reconstructed down-sampled luma samples and causal chroma samples may be utilized to derive the model parameters $\alpha$ and $\beta$:

$$\alpha = \frac{I \times \sum_{i=1}^{I} Rec_C(x_i, y_i) \times Rec'_L(x_i, y_i) - \sum_{i=1}^{I} Rec_C(x_i, y_i) \times \sum_{i=1}^{I} Rec'_L(x_i, y_i)}{I \times \sum_{i=1}^{I} Rec'_L(x_i, y_i) \times Rec'_L(x_i, y_i) - \left(\sum_{i=1}^{I} Rec'_L(x_i, y_i)\right)^2} \quad (5)$$

$$\beta = \frac{\sum_{i=1}^{I} Rec_C(x_i, y_i) - \alpha \times \sum_{i=1}^{I} Rec'_L(x_i, y_i)}{I} \quad (6)$$

where I may represent the total samples number of neighboring data; and $Rec_C(x_i, y_i)$ may represent the reconstructed chroma samples around the target CU.

Figure 7:
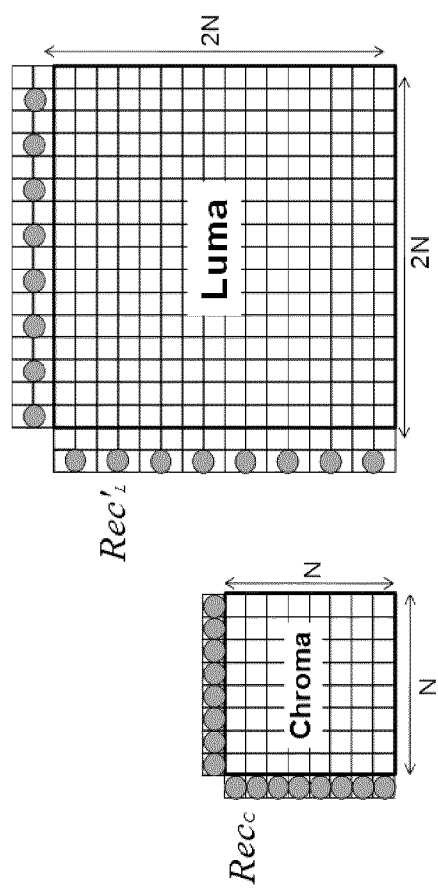
FIG. 7 shows an example causal samples.

FIG. 7 shows an example of causal samples. As shown in FIG. 7, the left and above causal samples marked as gray circles may be involved in the calculation to keep (e.g., total) samples number/as a power of 2. In examples, for a target N×N chroma block, if both left and above causal samples are available, the (e.g., total) involved samples number may be 2N. If left or above causal samples are available, the (e.g., total) involved samples number may be N.

Figure 8:
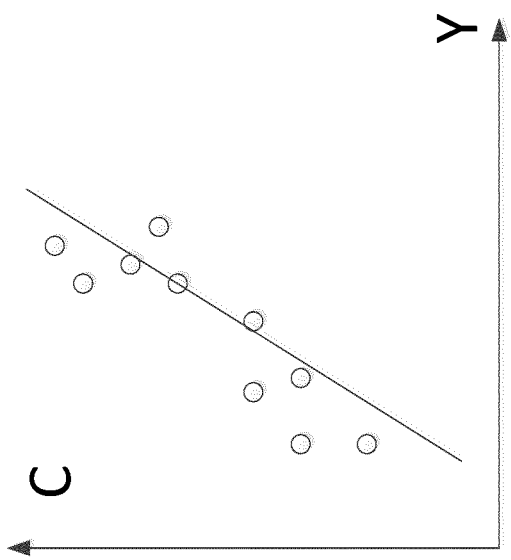
FIG. 8 shows an example of the linear relationship solved by linear regression.

FIG. 8 illustrates an example of a linear relationship solved by linear regression. A point in FIG. 8 may correspond to a pair of luma and chroma samples (Y, C).

In examples, the CCLM may be extended by adding multiple (e.g., three) MMLM modes, with which there may be more than one linear model between the luma samples and chroma samples in a CU.

In an MMLM mode (e.g., each MMLM mode), the reconstructed neighboring samples may be classified into multiple (e.g., two) classes using a threshold, and the threshold may be the average value of the luma reconstructed neighboring samples. The linear model of a class (e.g., each class) may be derived using the LMSE. The optimal mode (e.g., besides the CCLM mode) may be selected (e.g., by the encoder) in the rate distortion optimization (RDO) process and may be signaled (e.g., by the encoder).

Figure 9:
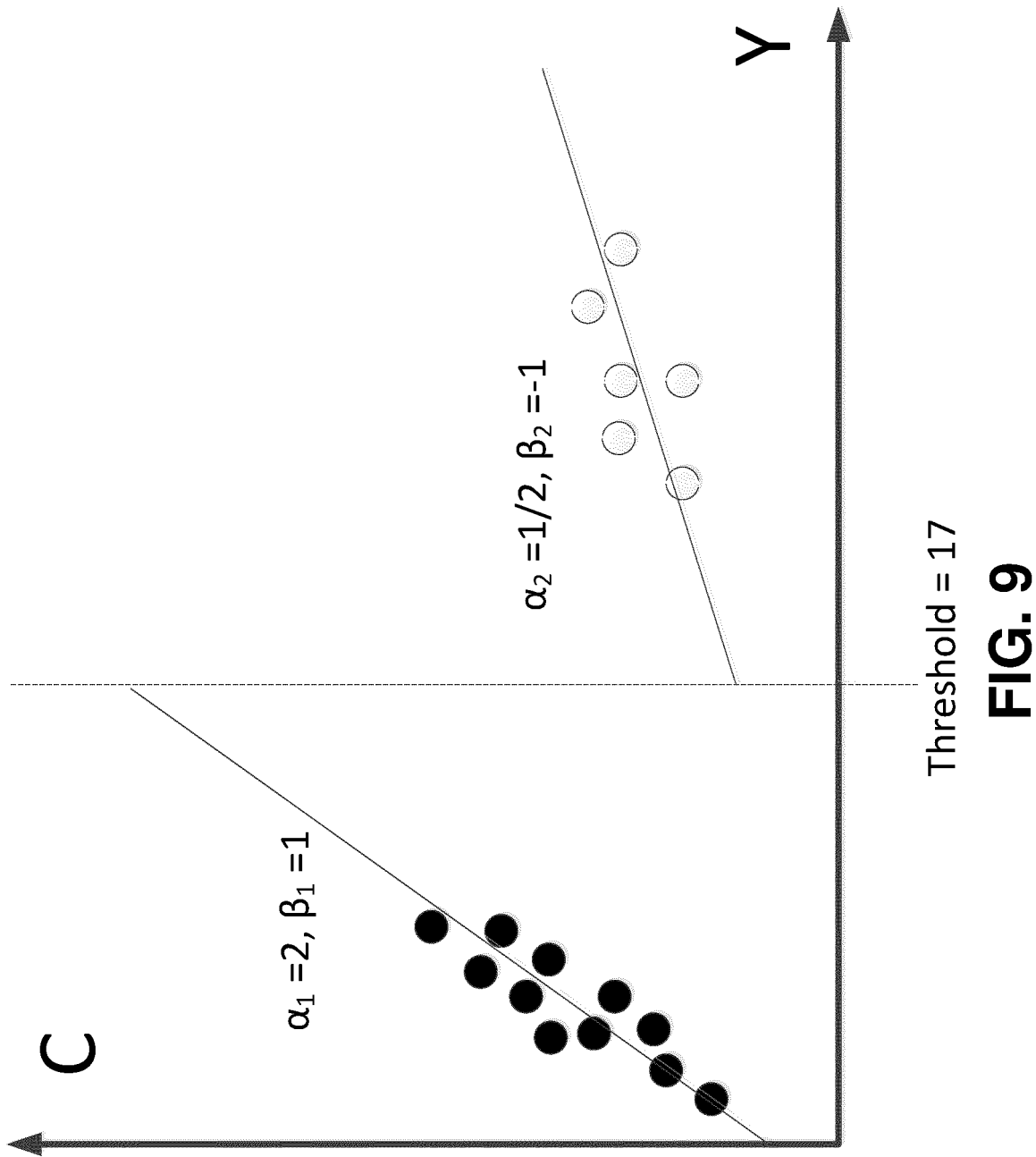
FIG. 9 shows an example of classifying neighboring samples into two groups.

FIG. 9 illustrates an example of classifying neighboring samples into two groups. Threshold(s) may be calculated as the average value of the neighboring reconstructed luma samples. A neighboring sample with $Rec_L'(x, y) \leq Threshold$ may be classified into group 1, while a neighboring sample with $Rec_L'(x, y) > Threshold$ may be classified into group 2. Two linear models may be derived as:

$$\begin{cases} Pred_C(x, y) = \alpha_1 \times Rec_L'(x, y) + \beta_1 & \text{if } Rec_L'(x, y) \leq \text{Threshold} \\ Pred_C(x, y) = \alpha_2 \times Rec_L'(x, y) + \beta_2 & \text{if } Rec_L'(x, y) > \text{Threshold} \end{cases} \quad (7)$$

Figure 10:
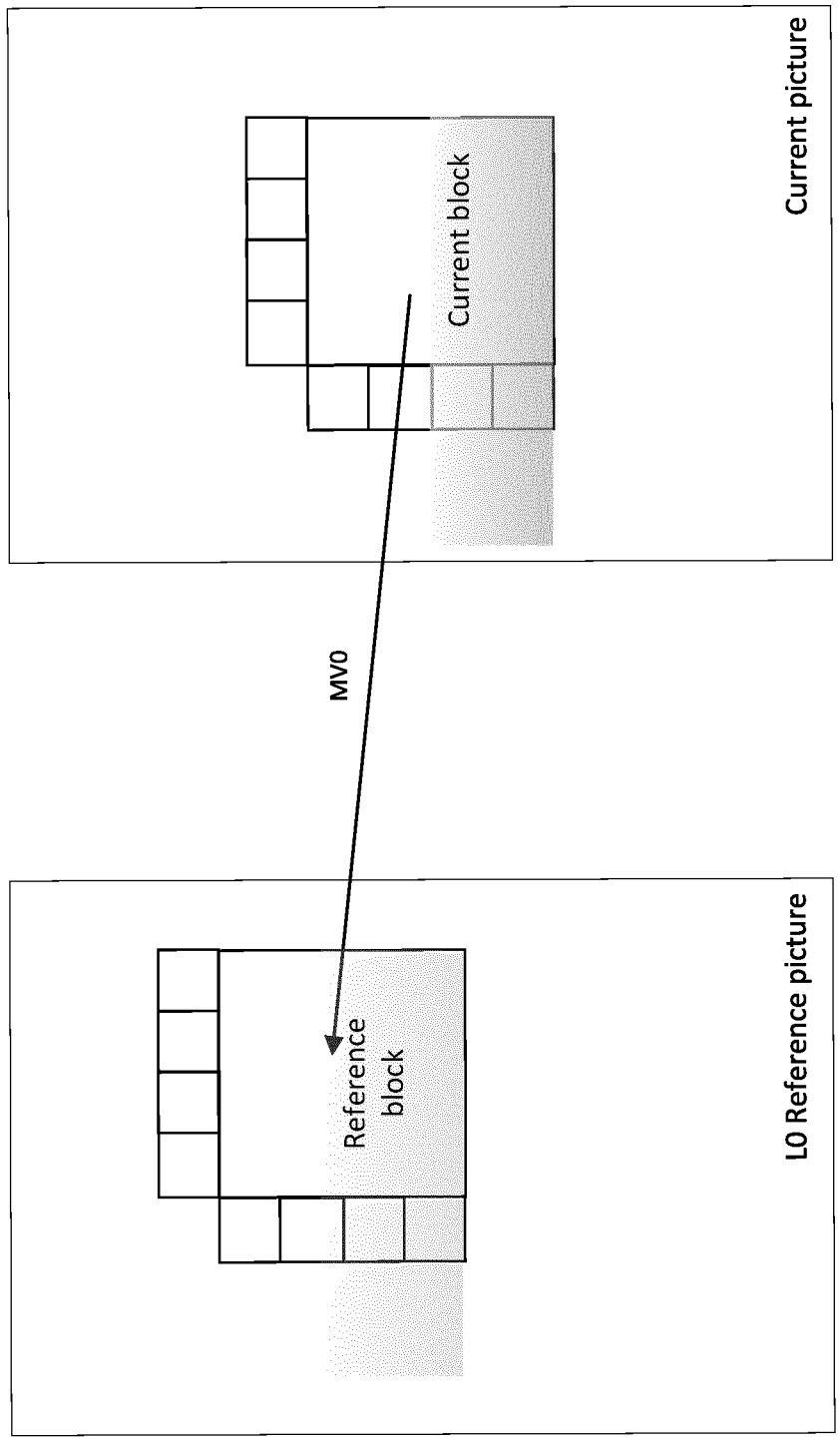
FIG. 10 shows an example where the temporal illumination changes appear differently from region to region or from sample to sample, within one block.

Coding efficiency of an inter block, e.g., with different temporal illumination discrepancy information from reference blocks in the reference frames, may be enhanced. In examples, blocks, where the temporal illumination changes appear differently from region to region or from sample to sample within one block, may be described herein, as shown in FIG. 10. FIG. 10 illustrates an example where the temporal illumination changes may appear differently from region to region or from sample to sample within one block.

In examples, if the LIC is enabled, one linear model may be applied to the samples within the block. One single estimated LIC linear model may not be suitable for one or more regions or one or more samples of the targeted block. Applying the estimated illumination information for correcting the predictions of the block (e.g., the whole block) may introduce errors and may increase the amount of the residual signals, which may be penalizing in terms of coding efficiency.

In examples, MMLM may apply to the chroma intra prediction. The concept of MMLM, e.g., with generating and using more than one model, may be applied for correcting an inter block with (e.g., different) illumination discrepancies inside the block.

Multiple linear models may be derived and used for compensating the different illumination discrepancies inside a block. An inter-predicted block may be divided vertically or horizontally into multiple sub-partitions and the LIC may be performed for each sub-partition separately. A linear model, or multiple linear models, with scaling factor(s) $\alpha$ and offset(s) $\beta$ may be derived using an LMSE or other linear model estimation. Based on one or more conditions (e.g., positions), the reconstructed neighboring samples of the current block and the reference block may be divided into multiple corresponding templates used for deriving multiple linear models. The prediction samples in the current block may be refined by applying multiple linear models or a (e.g., one) picked linear model.

As described herein, MMLM may be applied to enhance the coding efficiency of LIC, e.g., via generating and using multiple linear models. Sub-partition based LIC (SubLIC), e.g., with splitting a block into multiple sub-partitions, may add multiple linear models to adjust different temporal illumination discrepancies.

The possible sub-partitions for the SubLIC mode and the rules to generate the templates used to derive the linear models for the SubLIC mode may be described herein. Linear model estimation methods (e.g., linear model estimation methods other than LMSE) may be performed. Selection and application of linear model(s) for the prediction samples of a current block may be performed.

Figure 14:
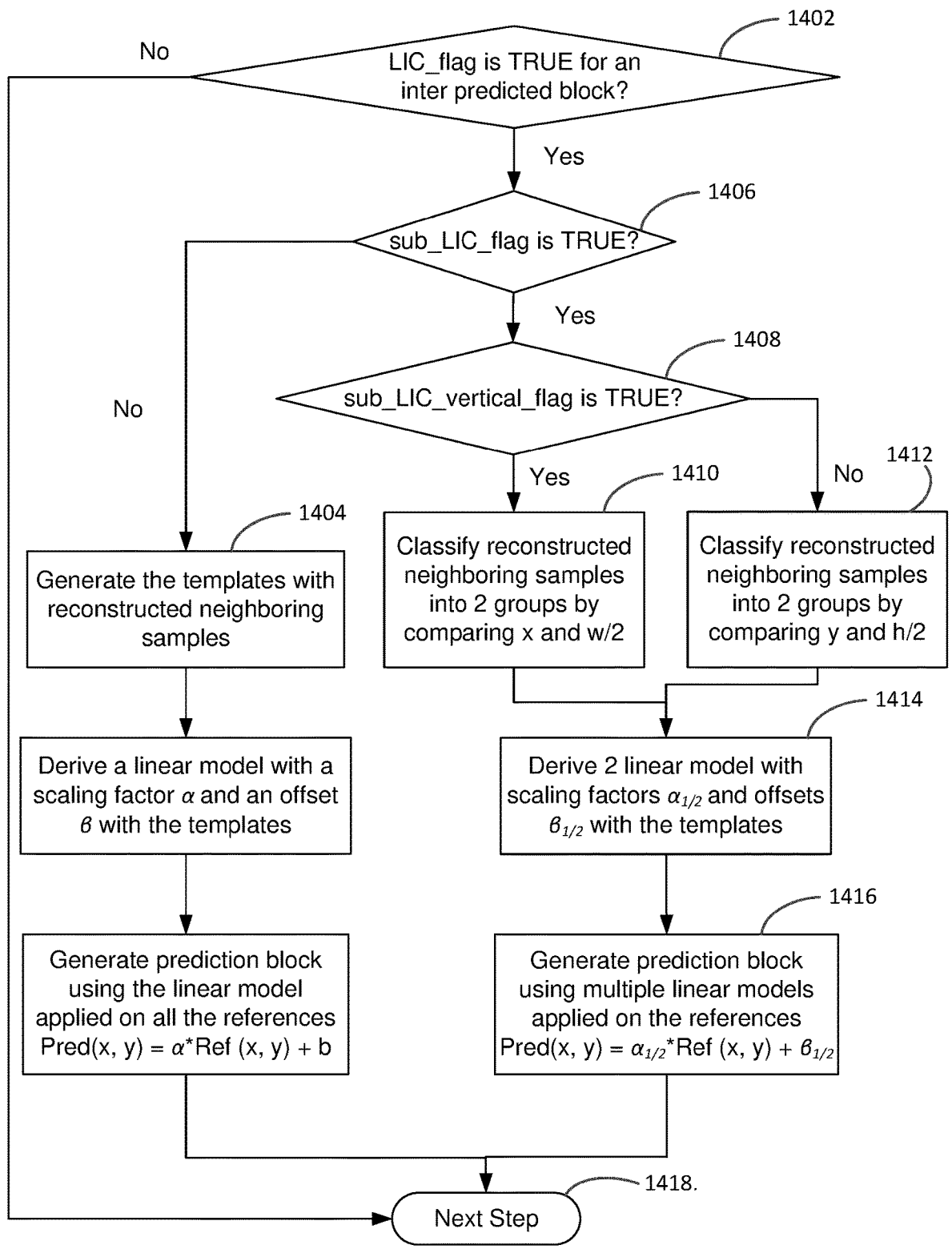
FIG. 14 shows an example of a decoding the LIC with multiple models.
Figure 16:
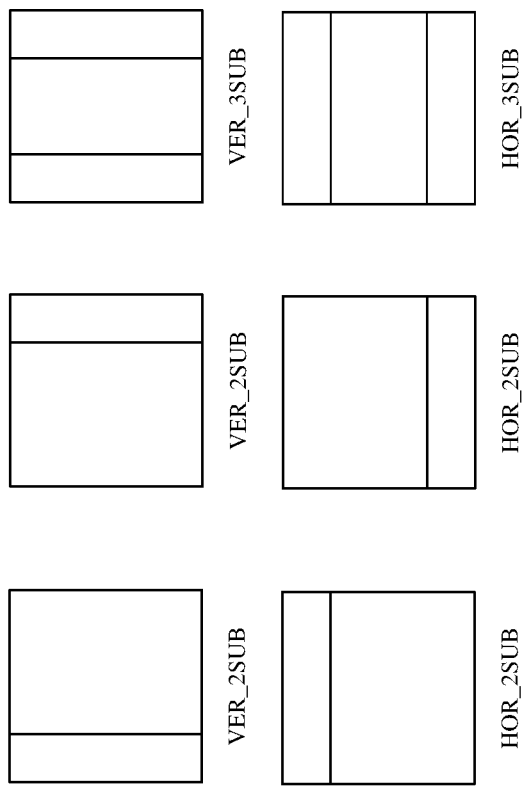
FIG. 16 shows an example of an inter-predicted block divided vertically or horizontally into asymmetrical sub-partitions.

FIG. 14 illustrates an example LIC with multiple models. An LIC_flag may be used to indicate whether LIC is being used. The LIC flag of an inter-predicted block may be decoded. At 1402, if the LIC_flag is true for the inter-predicted block, a sub-LIC enablement indicator, e.g., sub_LIC_flag, may be used to indicate whether the block is split into sub-partitions or not. If sub_LIC_flag equals FALSE, the LIC mode with one single linear model may be applied on the whole block at 1404. At 1406, if sub_LIC_flag equals TRUE, the SubLIC modes with multiple linear models may be applied on the block and a sub-LIC direction indication, e.g., sub_LIC_vertical_flag, may be used to indicate whether the split is a vertical split or a horizontal split.

Figure 11:
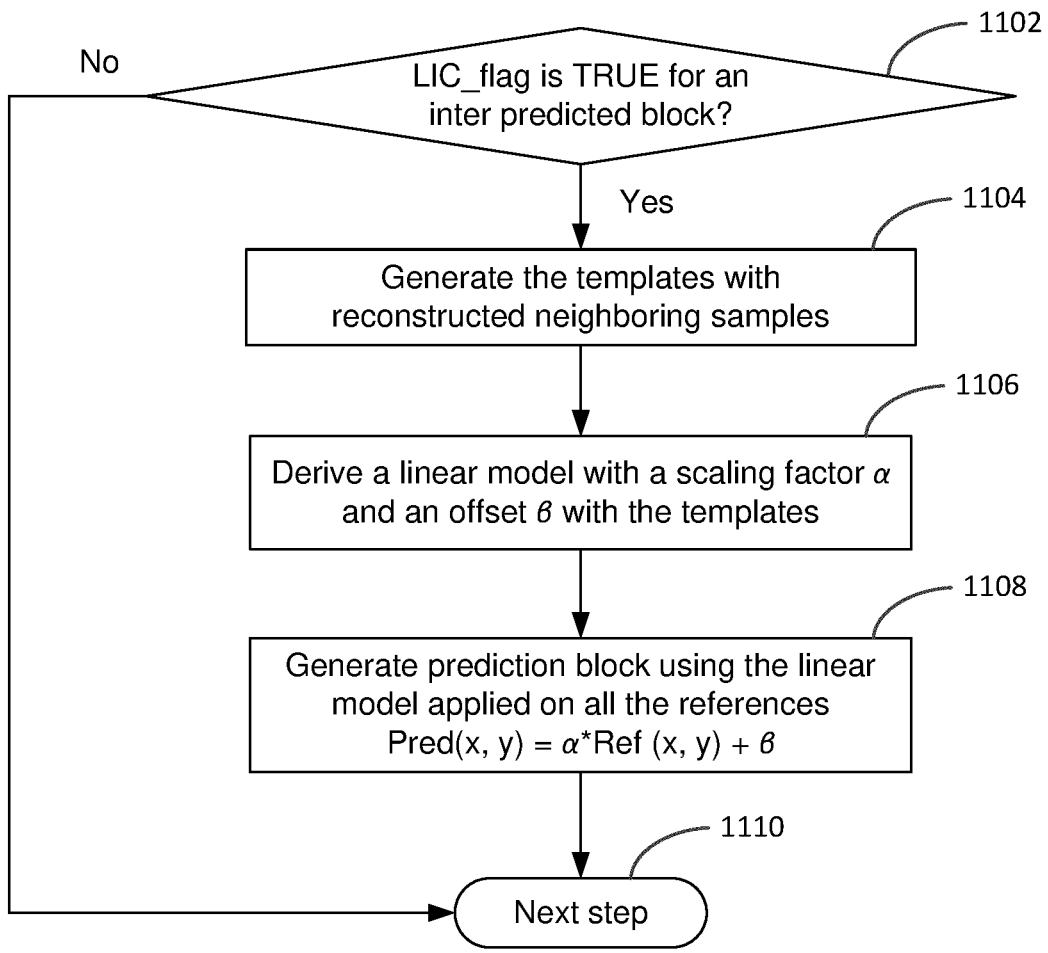
FIG. 11 shows an example flow diagram of an LIC model.

SubLIC mode with multiple linear models may be used to encode and/or decode a block. FIG. 11 illustrates an example flow diagram of an LIC model. An LIC_flag may be used to indicate whether LIC is being used. The LIC_flag of an inter-predicted block may be decoded. At 1102, if the LIC_flag is true for the inter-predicted block, the reconstructed neighboring samples of the current block and its reference block may, at 1104, be used to generate templates. At 1106, a linear model with a scaling factor $\alpha$ and an offset $\beta$ may be derived using the LMSE with the templates and may be applied to the reference samples, for example, to obtain the prediction samples of the current block at 1108, which may be used to compensate the temporal illumination changes.

The temporal illumination discrepancies may appear differently from region to region or from sample to sample within one block. For example, a single estimated LIC linear model may not be suitable for one or more regions or samples of the block.

In examples, to mitigate error introduced by applying unsuitable illumination compensation information to one or more regions of a single block, an inter-predicted block may be divided (e.g., vertically or horizontally) into multiple sub-partitions, and LIC may be performed for the sub-partitions separately. For a sub-partition, a linear model, or multiple linear models, with scaling factor(s) $\alpha$ and offset(s) $\beta$ may be derived using the LMSE. The reconstructed neighboring samples of the current block and the reference block used for deriving the LIC parameters ($\alpha$ and $\beta$) may be divided into multiple corresponding templates. The prediction samples of a sub-partition in the current block may be generated by applying the corresponding linear model(s) on the associated reference samples.

Figure 12:
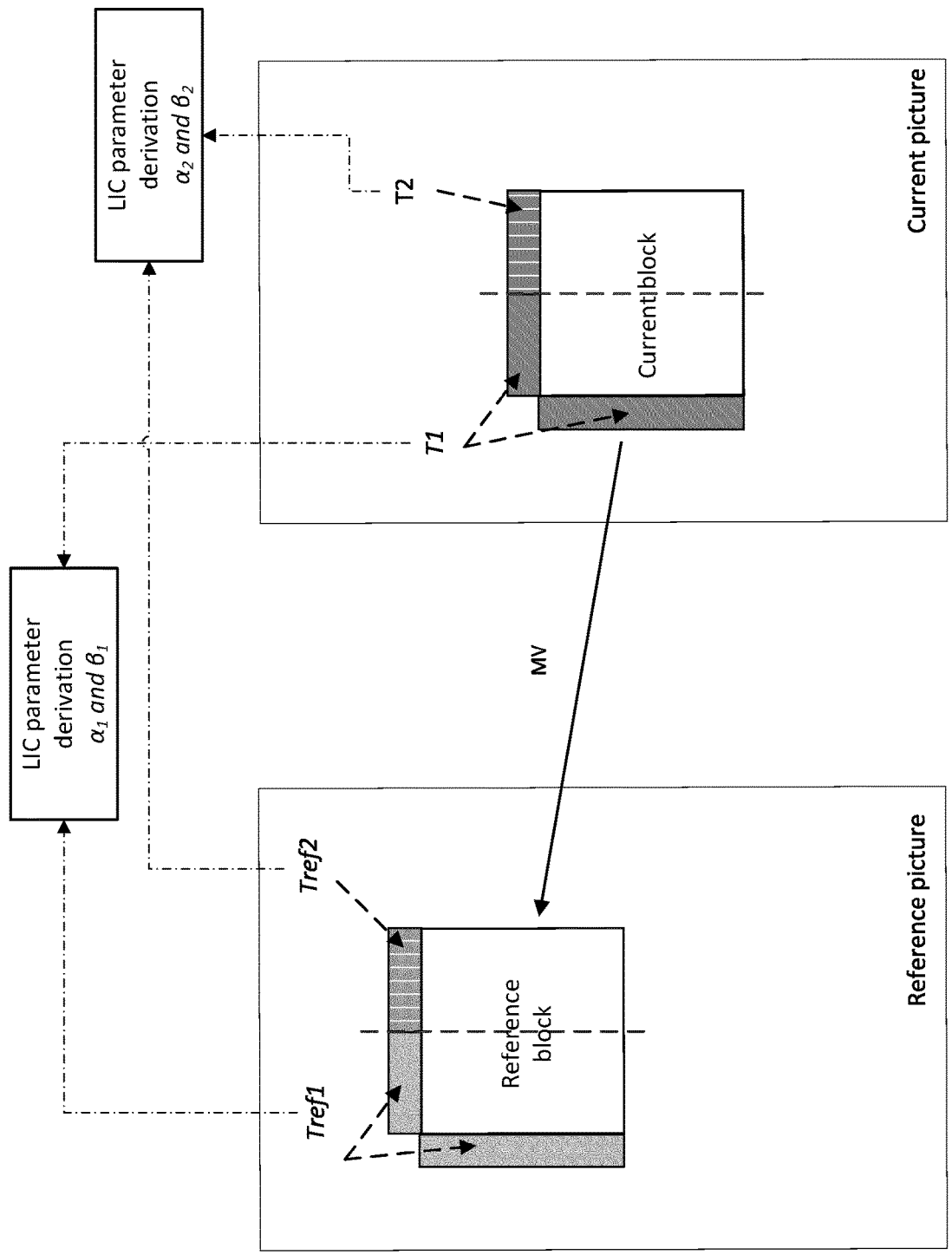
FIG. 12 shows an example of inter-predicted block vertical division.

Templates associated with the sub-partitions may be identified. Templates may be identified based on the partition direction and the number of sub-partitions in the block. FIG. 12 illustrates an example of inter-predicted block vertical division. As shown in FIG. 12, an inter-predicted block may be divided vertically into M, e.g., two, sub-partitions with equal size. The reconstructed neighboring samples may be divided into K (K≥M), e.g., two groups based on their positions with the vertical median line (e.g., dash line shown in FIG. 12), and may be used to generate two templates for the current block and two templates for the reference block. The reconstructed neighboring samples in the left column and the reconstructed neighboring samples in the above row located at the left side of the vertical median line may be identified as the templates for the first sub-partition, partition 1, (e.g., $T_1$ of the current block and $T_{ref1}$ of the reference block in FIG. 12). The remaining samples in the above row, which are located at the right side of the vertical median line, may be identified as the templates for the second sub-partition, e.g., partition 2 (e.g., $T_2$ of the current block and $T_{ref2}$ of the reference block in FIG. 12).

For a (e.g., each) sub-partition, one linear model may be derived using the LMSE with the corresponding templates as:

$$\alpha_{1/2} = \frac{N_{1/2} \times \sum_{i=1}^{N_{1/2}} T_{1/2}(x_i, y_i) \times T_{ref1/2}(x_i, y_i) - \sum_{i=1}^{N_{1/2}} T_{1/2}(x_i, y_i) \times \sum_{i=1}^{N_{1/2}} T_{ref1/2}(x_i, y_i)}{N_{1/2} \times \sum_{i=1}^{N_{1/2}} T_{ref1/2}(x_i, y_i) \times T_{ref1/2}(x_i, y_i) - \left(\sum_{i=1}^{N_{1/2}} T_{ref1/2}(x_i, y_i)\right)^2} \quad (8)$$

$$\beta_{1/2} = \frac{\sum_{i=1}^{N_{1/2}} T_{1/2}(x_i, y_i) - \alpha_{1/2} \times \sum_{i=1}^{N_{1/2}} T_{ref1/2}(x_i, y_i)}{N_{1/2}} \quad (9)$$

Reference samples in the reference block used to generate the prediction signals in the first sub-partition may be located (e.g., only located) at the left side of the vertical median line, for example, and the corresponding x coordinate may be smaller than or equal to half of the block width $$x \leq \frac{w}{2}.$$

Reference Samples used to generate the prediction signals in the second sub-partition may be located (e.g., only located) at the right side of the vertical median line, for example, and the corresponding x coordinate may be larger than half of the block width $$x > \frac{w}{2}.$$

Prediction samples in the current block may be generated with two linear models according to:

$$\begin{cases} P(x, y) = \alpha_1 \times P_r(x, y) + \beta_1 & \text{if } x \leq \frac{w}{2} \\ P(x, y) = \alpha_2 \times P_r(x, y) + \beta_2 & \text{if } x > \frac{w}{2} \end{cases} \quad (10)$$

Figure 13:
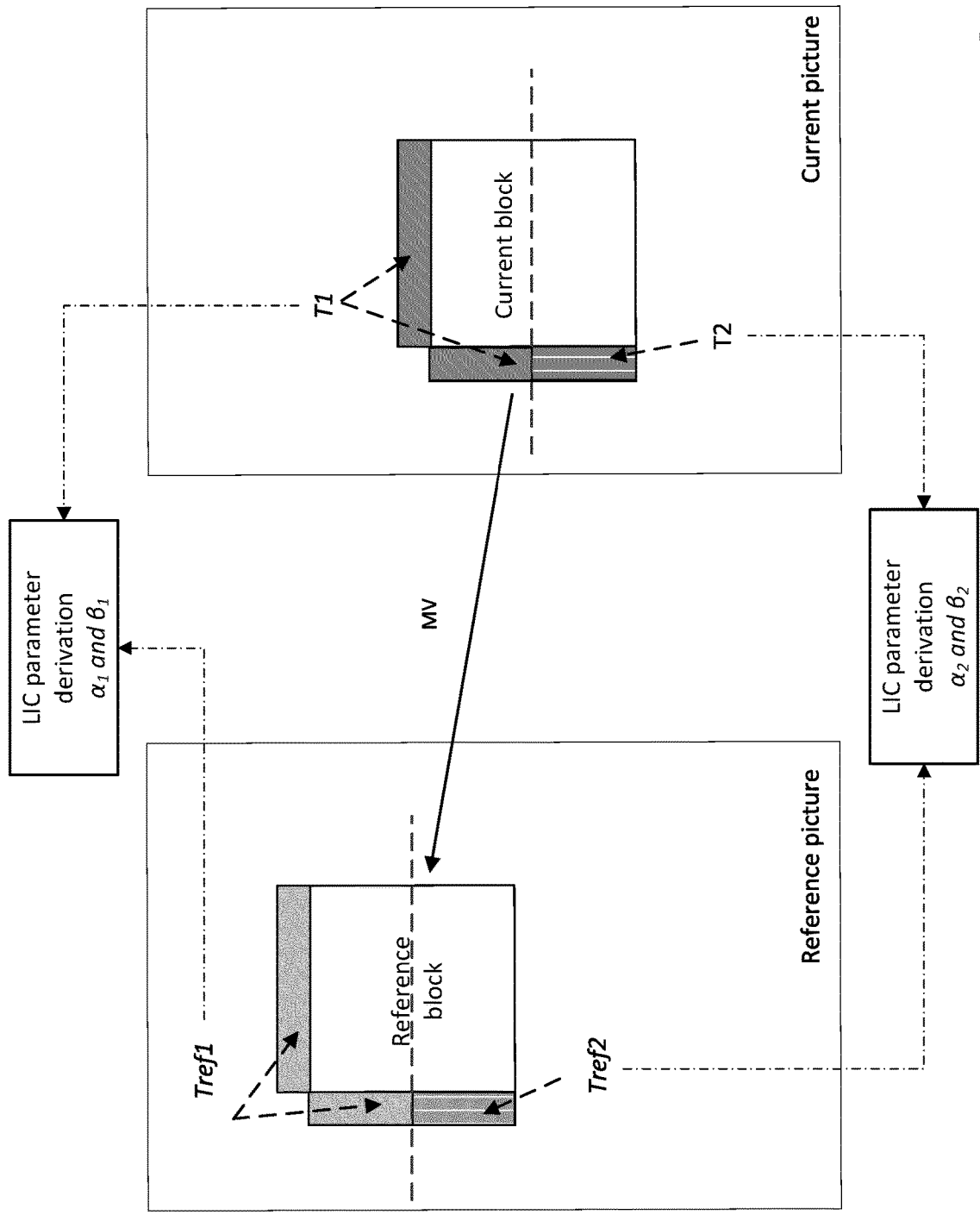
FIG. 13 shows an example of inter-predicted block horizontal division.

FIG. 13 illustrates an example of inter-predicted block horizontal division. An inter-predicted block may be divided horizontally into two sub-partitions with equal size, as shown in FIG. 13. The reconstructed neighboring samples may be divided into two groups based on their positions with the horizontal median line. The two templates for the current block and the two templates for the reference block may be identified. Of the two templates, a first template may, for example, correspond to a top sub-partition of the current block, and the first template may include samples (e.g., reconstructed samples) neighboring a left border and a top border of the top sub-partition of the current block. A second template, for example, may correspond to a bottom sub-partition of the current block, and the second template may include samples (e.g., reconstructed samples) neighboring a left border of the bottom sub-partition of the current block.

In an example, for a (e.g., each) horizontal sub-partition, one linear model may be derived using the LMSE with the corresponding templates. Reference samples in the reference block used to generate the prediction signals in the first sub-partition may be located at the above side of the horizontal median line, for example, and the corresponding y coordinate may be smaller than or equal to half of the block height $$y \leq \frac{h}{2}.$$

Reference samples used to generate the prediction signals in the second sub-partition may be located at the bottom side of the horizontal median line, for example, and the corresponding y coordinate may be larger than half of the block height $$y > \frac{h}{2}.$$

Prediction samples in the current block may be generated with multiple (e.g., two) linear models according to:

$$\begin{cases} P(x, y) = \alpha_1 \times P_r(x, y) + \beta_1 & \text{if } y \leq \frac{h}{2} \\ P(x, y) = \alpha_2 \times P_r(x, y) + \beta_2 & \text{if } y > \frac{h}{2} \end{cases} \quad (11)$$

In examples, if the LIC is enabled for an inter-predicted block, besides the LIC mode with one single linear model for the whole block, there may be two additional SubLIC modes with multiple linear models for the block. The encoder may choose the optimal mode in an RDO process and signal (e.g., explicitly or implicitly signal) the mode.

An indication, such as a sub-LIC enablement indicator, may be included in video data to indicate whether sub-LIC is enabled for a block. For example, the encoder may choose to enable sub-LIC for a coding block and may set the sub-LIC enablement indicator to indicate that sub-LIC is used to code the coding block. The decoder may, based on the sub-LIC enablement indicator in the video data indicating that sub-LIC is enabled for the current block, that sub-LIC is enabled for the current block. As shown in table 1, a sub-LIC enablement indicator, e.g., sub_LIC_flag, may be signaled to indicate whether the block is split into two sub-partitions to be compensated with two linear models or not.

An indication, such as a sub-LIC direction indication, may be signaled in video data to indicate the sub-LIC direction. For example, the encoder may determine a sub-LIC direction (e.g., block splitting direction), based on an RDO process. The encoder may include a sub-LIC direction indication in video data to indicate the determined sub-LIC direction. As shown in table 1, a sub-LIC direction indication, e.g., sub_LIC_vertical_flag, may be signaled to indicate the splitting direction.

As shown in Table 1, signaling of the sub-LIC direction indication may be conditioned on whether sub-LIC is enabled. For example, a sub-LIC direction indication may be included (e.g., by an encoder) in video data based on determining to enable sub-LIC for the block. A decoder may determine whether a sub-LIC direction indication is included in video data (e.g., a bitstream) based on the value of the sub-LIC enablement indicator.

In an example, the sub-LIC direction indication may be obtained (e.g., obtained by a decoder) from a bitstream based on the sub-LIC enablement indicator indicating that sub-LIC is enabled, and the current block may be divided into the multiple sub-partitions (e.g., the two additional subLIC modes with multiple linear models, as referenced herein) based on the sub-LIC direction indication.

As shown in Table 1, if the value of sub_LIC_flag indicates that sub-LIC is enabled for the current block (e.g., sub_LIC_flag equals TRUE), a sub-LIC direction indication, e.g., sub_LIC_vertical_flag, may be signaled to indicate the splitting direction. Example syntaxes related to the SubLIC are shown in Table 1, and they may be context-adaptive arithmetic entropy-coded syntax elements (e.g., marked as ae(v) in Table 1).

TABLE 1

Example of a coding unit including syntaxes of the SubLIC (e.g., proposed SubLIC)

|  | Descriptor |
|---|---|
| coding_unit( x0, y0, cbWidth, cbHeight, chType) { <br> ... <br> if (CuPredMode [ chType ][ x0 ][ y0 ] == MODE_INTER && <br> chType == LUMA && general_merge_flag[ x0 ][ y0 ] == 0) { <br>   lic_flag [ x0 ][ y0 ] <br>   if (lic_flag [ x0 ][ y0 ]) { <br>     sub_LIC_flag [ x0 ][ y0 ] <br>     if (sub_lic_flag [ x0 ][ y0 ]) { <br>       sub_LIC_vertical_flag [ x0 ][ y0 ] <br>     } <br>   } <br> } <br> ... |  <br><br><br> ae(v) <br><br> ae(v) <br><br> ae(v) |

The templates associated with the sub-partitions may be identified and, LIC parameter sets associated with the sub-partitions may be derived based on the templates associated with the sub-partitions. Turning back to FIG. 14, at 1408, if sub_LIC_vertical_flag equals TRUE, the block may, at 1410, be divided vertically into two sub-partitions and the reconstructed neighboring samples of the current block and its reference block may be divided into two groups, based on the relationship between their x coordinates and the half width of the block w/2, to generate templates. In examples, the block may, at 1412 be divided horizontally into two sub-partitions and the reconstructed neighboring samples of the current block, and its reference block may be divided into two groups, based on the relationship between their y coordinates and the half height of the block h/2, to generate templates. At 1414, two linear models with scaling factors $\alpha_{1/2}$ and offsets $\beta_{1/2}$ may be derived using the LMSE with the templates and may be applied to the reference samples based on the same rule for the template generation, to obtain, at 1416, the prediction samples associated with the corresponding coordinate of the current block.

In an example, when the LIC is enabled for an inter-predicted block, the optimal mode among the LIC mode and the (e.g., two additional) SubLIC modes may be determined based on the block size and/or block shape. If the block size is smaller than 4×8 (or 8×4), the corresponding block may not be further divided into sub-partitions with the SubLIC. There may be no requirement for adding a transform (e.g., sub-partition) smaller than 4×4. If the inter-predicted block is a square block, e.g., when the width of the block equals the height of the block (w=h), the LIC mode with one LIC model (e.g., one LIC parameter set) may be applied. In an example, the SubLIC may be used for a rectangular block. The SubLIC may divide the rectangular block (e.g., inter-predicted rectangular block) vertically or horizontally into two sub-partitions depending on the block shape. The SubLIC may be applied for a rectangular block if the rectangular block is horizontally oriented, e.g., when the width of the block is greater than the height of the block (w>h). For example, a vertical split may be applied. The SubLIC may be applied for a rectangular block if the rectangular block is vertically oriented, e.g., when the height of the block is greater than the width of the block (h>w). For example, a horizontal split may be applied.

Possible sub-partitions for the SubLIC mode may be provided. As described herein, if the SubLIC mode is applied, an inter-predicted block may be divided vertically or horizontally into M sub-partitions.

The number of sub-partitions M may be pre-defined, fixed for the sequences, and/or signaled in a sequence parameter set (SPS), video parameter set (VPS), picture parameter set (PPS), and/or picture header. In examples, the number of sub-partitions M may be based on the block size (e.g., width and/or height of the current block).

FIG. 15 shows an example of an inter-predicted block divided vertically or horizontally into symmetrical sub-partitions. In examples, an inter-predicted block may be divided vertically or horizontally into M sub-partitions with equal size. In examples, as shown in FIG. 15, a 32×32 block with a vertical split may be divided into two sub-partitions with each sub-partition of size 16×32, or into four sub-partitions with each sub-partition of size 8×32. A 32×32 block with a horizontal split may be divided into two sub-partitions with each sub-partitions of size 32×16 or into four sub-partitions with each sub-partitions of size 32×8. In examples, an inter-predicted block may be divided vertically or horizontally into M sub-partitions with different sizes. In examples, as may be shown in FIG. 16, a 32×32 block with an un-equal vertical split may be divided into two sub-partitions (e.g., 8×32 and 24×32 or 24×32 and 8×32) or into three sub-partitions (8×32, 16×32, 8×32). A 16×16 block with an un-equal horizontal split may be divided into two sub-partitions (32×8 and 32×24 or 32×24 and 32×8) or into three sub-partitions (32×8, 32×16, 32×8). A determination of the divisions, as described herein, may be made by an encoding device and/or a decoding device.

In examples, the sub-partitions may fulfill a condition of having (e.g., at least) N samples, e.g., 16 samples. In examples, the sub-partitions may fulfill the condition of being larger than or equal to a minimum size, e.g., 4×4. The minimum number of samples N, or the minimum size, may be pre-defined and fixed for the sequences or may be signaled in SPS, VPS, PPS, and/or a picture header. In examples, the minimum number of samples N, or the minimum size, may be determined based on the block size (e.g., width and/or height of the current block). If a sub-partition fails the condition of having (e.g., at least) N samples or being larger than or equal to a minimum size, splitting may be stopped, e.g., the value of number of sub-partitions M may be set to zero.

Templates may be used to derive the linear models for the SubLIC mode. As described herein, if the SubLIC mode is applied for an inter-predicted block, the reconstructed neighboring samples of the current block and its reference block may be divided into K groups based on the positions of the neighboring samples for generating the templates, which may be used to derive K linear models.

In examples, the value of the number of groups (e.g., or linear models) K may be larger than or equal to the value of number of sub-partitions M. If the number of groups (e.g., or linear models) is equal to the number of sub-partitions, a linear model may be applied for each sub-partition; otherwise, multiple linear models, or a picked linear model, may be applied for each sub-partition.

The value of the number of groups (e.g., or linear models) K may be determined based on the value of number of sub-partitions M, pre-defined/fixed for the sequences, and/or signaled in SPS, VPS, PPS, and/or a picture header. In examples, the value of the number of groups K may be decided based on the block size (e.g., width and/or height of the current block).

The reconstructed neighboring samples, e.g., in a left column and an above row, of a current block and its reference block may be divided into K groups based on their positions. The division may be determined based on their coordinates, the width and/or height of the current block, and/or a relationship between the coordinates and the width/height of the current block. In examples, the reconstructed neighboring samples may be divided into K groups based on their intensities. The division may be determined based on, the sample values the average/median value of the reconstructed neighboring samples, and/or the relationship between the sample values and the average/median value of the reconstructed neighboring samples.

Reconstructed neighboring samples of a current block and its reference block (e.g., more reconstructed neighboring samples of a current block and its reference block), based on the availability, may be used to generate the templates. In some examples, samples located in one above row and one left column, may be used to generate the templates. In some examples, neighboring samples located in multiple lines above and/or multiple lines left lines may be used to generate the templates for sub-partitions of the current block and/or the reference block.

Figure 17:
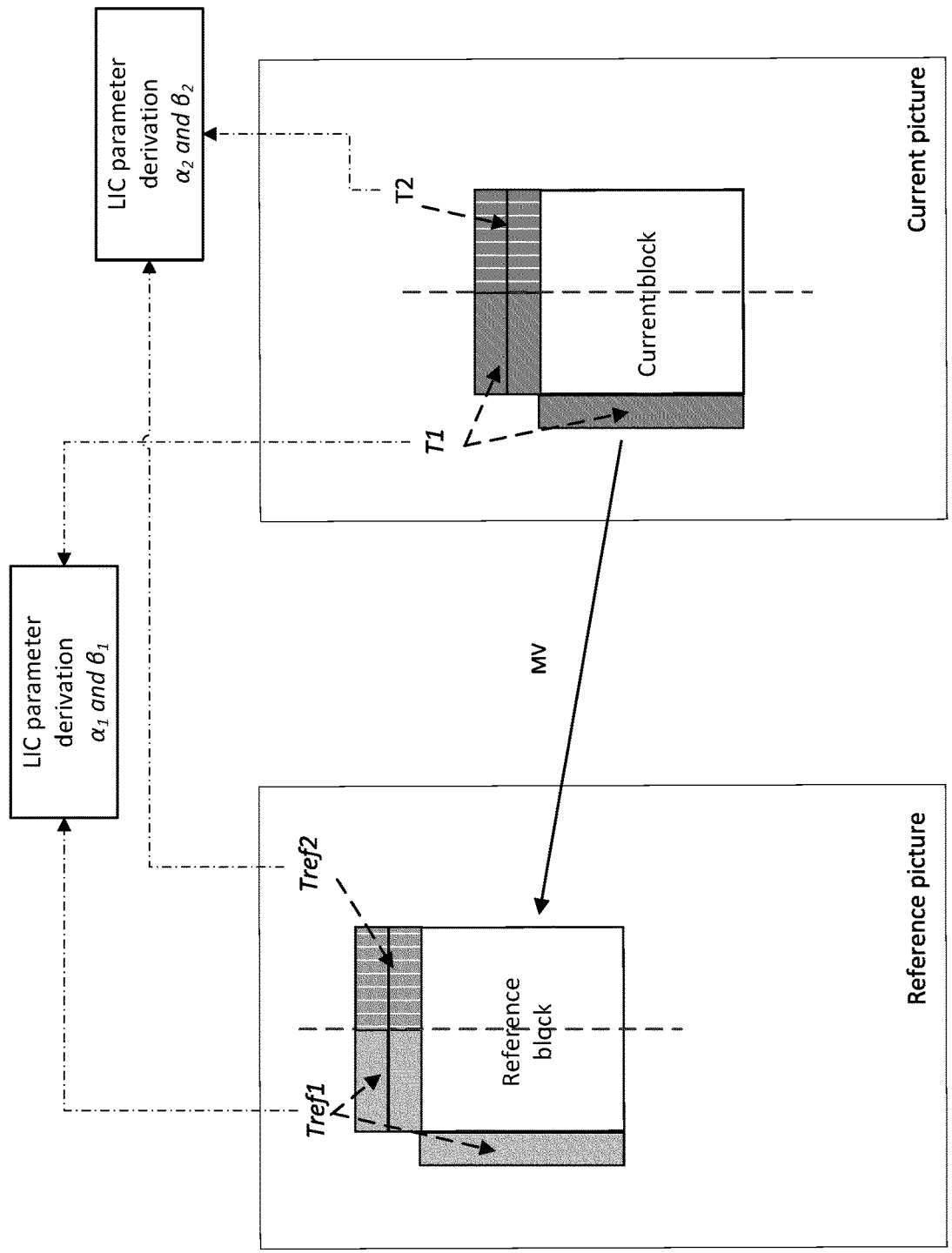
FIG. 17 shows an example of a block with a vertical split being divided into sub-partitions and the templated samples for each sub-partition at multiple above and/or left neighboring lines.

FIG. 17 illustrates an example of a block with a vertical split being divided into sub-partitions, and the templated samples for sub-partitions may be in multiple above or/and left neighboring lines. As shown in FIG. 17, a 32×32 block with a vertical split may be divided into two sub-partitions each with a size of 16×32. The reconstructed neighboring samples in the nearest left column and the reconstructed neighboring samples in the nearest and the second nearest above rows, whose x coordinates are less than or equal to half of the block width x≤16, may be assigned the templates for the first sub-partition (e.g., $T_1$ of the current block and $T_{ref1}$ of the reference block in FIG. 17), and the remaining reconstructed neighboring samples in the nearest and the second nearest above rows, whose x coordinates are larger than half of the block width x>16, may be assigned the templates for the second sub-partition (e.g., $T_2$ of the current block and $T_{ref2}$ of the reference block in FIG. 17). The value of the number of lines may be pre-defined and fixed for the sequences or may be signaled in SPS, VPS, PPS, and/or a picture header. In examples, the value of the number of lines may be decided based on the block size (e.g., width and/or height of the current block). In examples, the number of above lines and the number of left lines may be set separately. The number of above lines and the number of left lines may be set for each sub-partition (e.g., separately).

Figure 18:
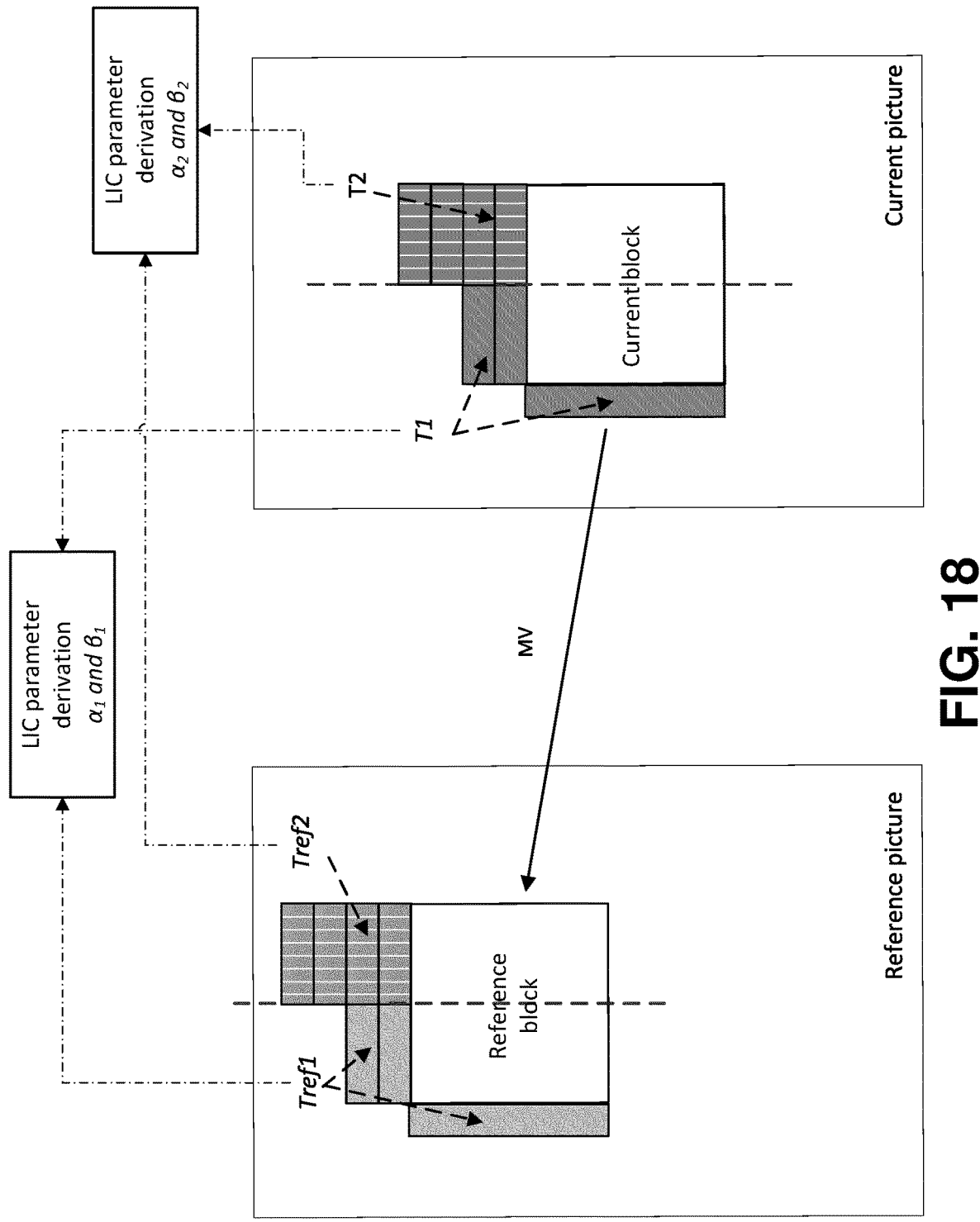
FIG. 18 shows an example of a block with a vertical split being divided into sub-partitions and the templated samples for each sub-partition at different above or/and left neighboring lines.

FIG. 18 shows an example of a block with a vertical split being divided into sub-partitions and the templated samples for each sub-partition at different above or/and left neighboring lines. As shown in FIG. 18, a 32×32 block with vertical split may be divided into two sub-partitions each with a size of 16×32. The reconstructed neighboring samples in the nearest left column and the reconstructed neighboring samples in the nearest and the second nearest above rows, whose x coordinates are smaller than or equal to half of the block width x≤16, may be assigned as the templates for the first sub-partition (e.g., $T_1$ of the current block and $T_{ref1}$ of the reference block in FIG. 18, which are the same as in FIG. 17). The remaining reconstructed neighboring samples in the four nearest above rows, whose x coordinates are larger than half of the block width x>16, may be assigned the templates for the second sub-partition (e.g., $T_2$ of the current block and $T_{ref2}$ of the reference block in FIG. 18).

In examples, the reconstructed neighboring blocks (e.g., the whole reconstructed neighboring blocks) of a current block and its reference block, based on availability, may be used to generate the templates.

Figure 19:
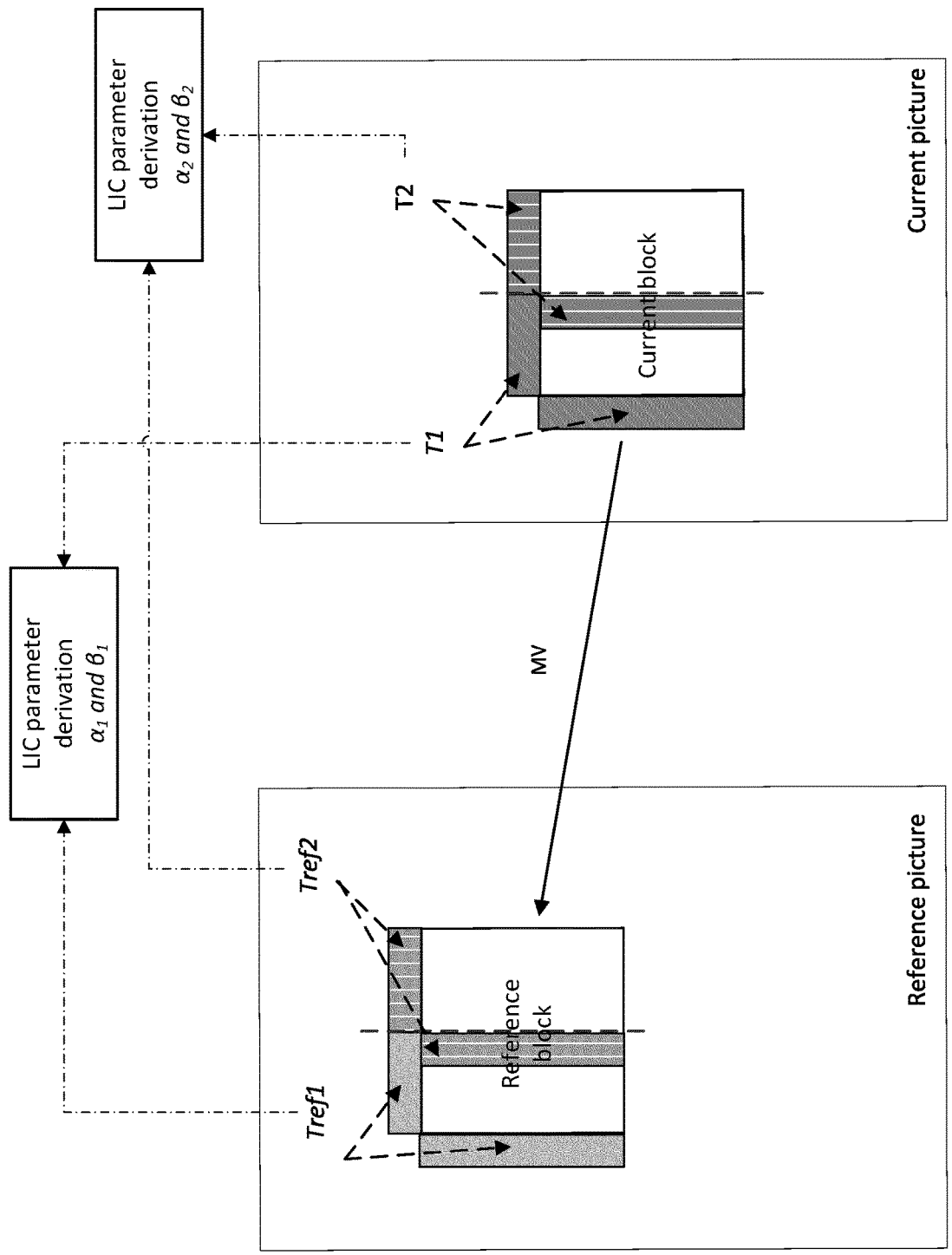
FIG. 19 shows an example of a block with a vertical split being divided into sub-partitions and the templated samples for one sub-partition at another sub-partition.

The reconstructed samples of a preceding coded sub-partition, based on the availability, may be used to generate the templates for a current sub-partition. As shown in FIG. 19, a 32×32 block with a vertical split may be divided into two sub-partitions each with a size of 16×32. The reconstructed neighboring samples in the nearest left column and the reconstructed neighboring samples in the nearest above row, whose x coordinates are smaller than or equal to half of the block width x≤16, may be assigned as the templates for the first sub-partition (e.g., $T_1$ of the current block and $T_{ref1}$ of the reference block in FIG. 19). The reconstructed samples of the first sub-partition in the nearest left column and the remaining reconstructed neighboring samples in the nearest above row, whose x coordinates are larger than half of the block width x>16, may be assigned the templates for the second sub-partition (e.g., $T_2$ of the current block and $T_{ref2}$ of the reference block in FIG. 19).

The templates for different sub-partitions may have the same number of reconstructed neighboring samples. In examples, the templates may fulfill the condition of having N (e.g., at least N) reconstructed neighboring samples. A minimum number of reconstructed neighboring samples N in a template may be pre-defined/fixed for the sequences and/or signaled in SPS, VPS, PPS, and/or a picture header. In examples, the minimum number of reconstructed neighboring samples N in a template may be decided based on the block size (e.g., width and/or height of the current block). If the number of reconstructed neighboring samples in a template is smaller than the minimum number N, one or more reconstructed neighboring sample may be added to the template.

As described herein, a linear model, with a scaling factor $\alpha$ and an offset $\beta$, may be derived by minimizing the difference between the reconstructed neighboring samples of the current block and their corresponding reference samples in the temporal reference pictures. LMSE may be employed to derive the values of the linear model parameters. Other linear model estimations may be used.

In examples, a linear model may be derived using different estimations, including LMSE. The reconstructed neighboring samples of the current block and the reference block may be used for deriving the linear model parameters. The prediction samples of a current block may be generated by applying a linear model or multiple different linear models on the associated reference samples.

For example, a DC model may be used to derive a linear model for LIC. The DC model may be used to estimate a scaling factor $\alpha$ as the ratio of the sum value of reconstructed neighboring samples of the current block and the sum value of reconstructed neighboring samples of the corresponding reference block in the temporal reference pictures. The offset $\beta$ may be set as 0, as depicted in the following equation:

$$\alpha = \frac{\sum_{i=1}^{N} T(x_i, y_i)}{\sum_{i=1}^{N} T_r(x_i, y_i)} \quad (12)$$

$$\beta = 0 \quad (13)$$

Whether to select a DC model for LIC model estimation may be determined based on the content of the picture. For example, based on determining that the picture is associated with a scene with fade-in from black or fade-out to black, DC model may be selected. Deriving a linear model with the DC model may not be burdensome (e.g., in terms of calculation burden).

In examples, an offset-only model may be used to derive a linear model for LIC. The offset-only model may set a scaling factor $\alpha$ as 1 and may estimate an offset $\beta$ as the difference between the mean value of reconstructed neighboring samples of the current block and the mean value of reconstructed neighboring samples of the corresponding reference block in the temporal reference pictures, as depicted in the following equation:

$$\alpha = 1 \quad (14)$$

$$\beta = \frac{\sum_{i=1}^{N} T(x_i, y_i) - \sum_{i=1}^{N} T_r(x_i, y_i)}{N} \quad (15)$$

Whether to select an offset-only model for LIC model estimation may be determined based on the content of the picture. For example, based on determining that the picture is associated with a scene with fade-in from white or fade-out to white, the offset-only model may be selected. Deriving a linear model with the offset-only model may not be burdensome (e.g., in terms of calculation burden).

The DC and offset-only models may be used to derive a linear model for the LIC mode with a single LIC model. In examples, the DC and offset-only models may be used to derive a linear model for the SubLIC mode.

In some examples, the DC and offset-only models may be used to derive a linear model for the LIC/SubLIC for (e.g., only for) small-size blocks. In some examples, the DC and offset-only models may be used to derive a linear model for the LIC/SubLIC for large-size blocks (e.g., only for large-size blocks).

Linear model(s) may be used for the prediction samples of a current block. As described herein, if the LIC is enabled for an inter-predicted block and the LIC mode with one LIC model is selected, the prediction samples of the current block may be obtained by applying one linear model on the reference samples for the whole block (e.g., using equation (1). In examples, if the SubLIC mode is selected, the prediction samples of the current block may be obtained by applying multiple linear models on the reference samples using, for example, equation (10) or/and equation (11).

For a sub-partition, a linear model may be applied on the reference samples of the reference sub-partition to obtain the prediction samples associated with the corresponding coordinates of the current sub-partition. In examples, multiple linear models may be applied on the reference samples of the reference sub-partition to obtain the prediction samples associated with the corresponding coordinates of the current sub-partition.

For a sub-partition, a linear model (or multiple linear models) may be applied on the reference samples grouped by their positions to obtain the prediction samples associated with the corresponding coordinates of the current sub-partition. For example, the division rule may be the relationship between coordinates of the reference/current samples and the width/height of the current block.

A first linear model, e.g., derived by a first group of templates, may be applied to the whole/partial reference samples of the reference block to obtain a first set of prediction samples of the current block. A second linear model, e.g., derived by a second group of templates, may be applied to the whole/partial reference samples of the reference block to obtain a second set of prediction samples of the current block. The first set of prediction samples and the second set of prediction samples may be combined to obtain final prediction samples of the current block. For example, a first set of the prediction samples $P_1(x, y)$ may be obtained with a first scaling factor $\alpha_1$ and a first offset $\beta_1$. A second set of the prediction samples $P_2(x, y)$ may be obtained with a second scaling factor $\alpha_2$ and a second offset $\beta_2$. The final prediction $P(x, y)$ may be obtained by averaging $P_1(x, y)$ and $P_2(x, y)$, which may be mathematically modelled by the following equation:

$$P_1(x, y) = \alpha_1 \times P_r(x, y) + \beta_1 \quad (16)$$

$$P_2(x, y) = \alpha_2 \times P_r(x, y) + \beta_2$$

$$P(x, y) = \frac{P_1(x, y) + P_2(x, y)}{2}$$

Figure 20:
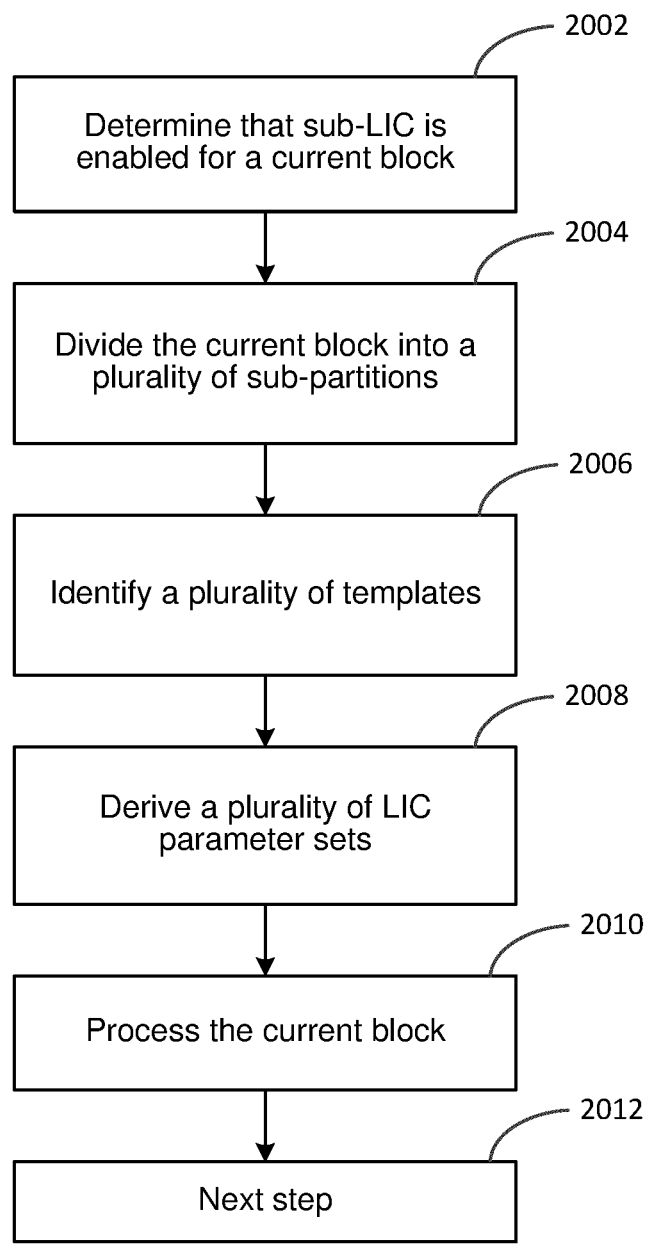
FIG. 20 illustrates an example LIC with multiple linear models.

FIG. 20 illustrates an example (e.g., for an encoding device or a decoding device) for performing LIC with multiple linear models. For example, at 2002, it may be determined that sub-LIC is enabled for a current block. At 2004, the current block may be divided into a plurality of sub-partitions. At 2006, a plurality of templates associated with the plurality of sub-partitions may be identified. At 2008, a plurality of LIC parameter sets associated with the plurality of sub-partitions may be derived. At 2010, the current block may be processed based on the plurality of LIC parameter sets. For example, a video encoding device may encode the current block based on the LIC parameter sets. For example, a video decoding device may decode the current block based on the LIC parameter sets.

While the examples provided herein may assume that media content is streamed to a display device, there is no specific restriction on the type of display device that may benefit from the example techniques described herein. For example, the display device may be a television, a projector, a mobile phone, a tablet, etc. Further, the example techniques described herein may apply to not only streaming use cases, but also teleconferencing settings. In addition, a decoder and a display as described herein may be separate devices or may be parts of a same device. For example, a set-top box may decode an incoming video stream and provide (e.g., subsequently) the decoded stream to a display device (e.g., via HDMI), and information regarding viewing conditions such as a viewing distance may be transmitted from the display device to the set-top box (e.g., via HDMI).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A video decoding device, comprising:
a processor configured to:
determine that sub-partition-based local illumination compensation (sub-LIC) is enabled for a current block;
divide the current block into a first sub-partition and a second sub-partition;
identify a first template associated with the first sub-partition;
derive a first local illumination compensation (LIC) parameter set based on the first template associated with the first sub-partition;
identify a second template associated with the second sub-partition;
derive a second LIC parameter set based on the second template associated with the second sub-partition;
apply the first LIC parameter set on a reference block of the current block to obtain a first prediction block of the current block;
apply the second LIC parameter set on the reference block of the current block to obtain a second prediction block of the current block; and
decode the current block based on the first prediction block and the second prediction block.

2. The device of claim 1, the processor further configured to:
obtain a sub-LIC enablement indicator configured to indicate whether sub-LIC is enabled for the current block, wherein that sub-LIC is enabled for the current block is determined based on the sub-LIC enablement indicator indicating that sub-LIC is enabled for the current block.

3. The device of claim 1, the processor further configured to:
determine whether a sub-LIC direction indication is included in video data based on a sub-LIC enablement indicator; and
based on the sub-LIC enablement indicator indicating that sub-LIC is enabled, obtain the sub-LIC direction indication from the video data, wherein the current block is divided into the first sub-partition and the second sub-partition based on the sub-LIC direction indication.

4. The device of claim 1, wherein the first template corresponds to a left sub-partition of the current block, and the first template comprises reconstructed samples neighboring a left border and a top border of the left sub-partition of the current block, and the second template corresponds to a right sub-partition of the current block, and the second template comprises reconstructed samples neighboring a top border of the right sub-partition of the current block.

5. The device of claim 1, wherein the first template corresponds to a top sub-partition of the current block, and the first template comprises reconstructed samples neighboring a left border and a top border of the top sub-partition of the current block, and the second template corresponds to a bottom sub-partition of the current block, and the second template comprises reconstructed samples neighboring a left border of the bottom sub-partition of the current block.

6. The device of claim 1, wherein the processor is further configured to:
apply the first LIC parameter set on a plurality of reference samples of the first sub-partition to obtain a plurality of prediction samples of the first sub-partition;
apply the second LIC parameter set on a plurality of reference samples of the second sub-partition to obtain a plurality of prediction samples of the second sub-partition; and
obtain a prediction block of the current block by combining the plurality of prediction samples of the first sub-partition and the plurality of prediction samples of the second sub-partition, the current block being decoded based on the prediction block.

7. A method for video decoding, the method comprising:
determining that sub-partition-based local illumination compensation (sub-LIC) is enabled for a current block;
dividing the current block into a first sub-partition and a second sub-partition;
identifying a first template associated with the first sub-partition;
deriving a first local illumination compensation (LIC) parameter set based on the first template associated with the first sub-partition;
identifying a second template associated with the second sub-partition;
deriving a second LIC parameter set based on the second template associated with the second sub-partition;
applying the first LIC parameter set on a reference block of the current block to obtain a first prediction block of the current block;
applying the second LIC parameter set on the reference block of the current block to obtain a second prediction block of the current block; and
decoding the current block based on the first prediction block and the second prediction block.

8. The method of claim 7, the method further comprising:
obtaining a sub-LIC enablement indicator configured to indicate whether sub-LIC is enabled for the current block, wherein that sub-LIC is enabled for the current block is determined based on the sub-LIC enablement indicator indicating that sub-LIC is enabled for the current block.

9. The method of claim 7, the method further comprising:
determining whether a sub-LIC direction indication is included in video data based on a sub-LIC enablement indicator; and
based on the sub-LIC enablement indicator indicating that sub-LIC is enabled, obtaining the sub-LIC direction indication from the video data, wherein the current block is divided into the first sub-partition and the second sub-partition based on the sub-LIC direction indication.

10. The method of claim 7, wherein the first template corresponds to a left sub-partition of the current block, and the first template comprises reconstructed samples neighboring a left border and a top border of the left sub-partition of the current block, and the second template corresponds to a right sub-partition of the current block, and the second template comprises reconstructed samples neighboring a top border of the right sub-partition of the current block.

11. The method of claim 7, wherein the first template corresponds to a top sub-partition of the current block, and the first template comprises reconstructed samples neighboring a left border and a top border of the top sub-partition of the current block, and the second template corresponds to a bottom sub-partition of the current block, and the second template comprises reconstructed samples neighboring a left border of the bottom sub-partition of the current block.

12. The method of claim 7, wherein the method further comprises:
  applying the first LIC parameter set on a plurality of reference samples of the first sub-partition to obtain a plurality of prediction samples of the first sub-partition;
  applying the second LIC parameter set on a plurality of reference samples of the second sub-partition to obtain a plurality of prediction samples of the second sub-partition; and
  obtaining a prediction block of the current block by combining the plurality of prediction samples of the first sub-partition and the plurality of prediction samples of the second sub-partition, the current block being decoded based on the prediction block.

13. A video encoding device, comprising:
  a processor configured to:
    determine to enable sub-partition-based local illumination compensation (sub-LIC) for a current block;
    divide the current block into a first sub-partition and a second sub-partition;
    identify a first template associated with the first sub-partition;
    derive a first local illumination compensation (LIC) parameter set based on the first template associated with the first sub-partition;
    identify a second template associated with the second sub-partition;
    derive a second LIC parameter set based on the second template associated with the second sub-partition;
    apply the first LIC parameter set on a reference block of the current block to obtain a first prediction block of the current block;
    apply the second LIC parameter set on the reference block of the current block to obtain a second prediction block of the current block; and
    encode the current block based on the first prediction block and the second prediction block.

14. The device of claim 13, the processor further configured to:
  based on determining to enable sub-LIC for the current block, include, in video data, a sub-LIC enablement indicator configured to indicate that sub-LIC is enabled for the current block.

15. The device of claim 13, the processor further configured to:
  based on determining to enable sub-LIC for the current block, determine a sub-LIC direction for dividing the current block, wherein the current block is divided into the first sub-partition and the second sub-partition based on the determined sub-LIC direction; and
  include a sub-LIC direction indication configured to indicate the determined sub-LIC direction in video data.

16. The device of claim 13, wherein a first template of the plurality of templates corresponds to a left sub-partition of the current block, and the first template comprises samples neighboring a left border and a top border of the left sub-partition of the current block, and a second template of the plurality of templates corresponds to a right sub-partition of the current block, and the second template comprises samples neighboring a top border of the right sub-partition of the current block.

17. A method for video encoding, the method comprising:
  determining to enable sub-partition-based local illumination compensation (sub-LIC) for a current block;
  dividing the current block into a first sub-partition and a second sub-partition;
  identifying a first template associated with the first sub-partition;
  deriving a first local illumination compensation (LIC) parameter set based on the first template associated with the first sub-partition;
  identifying a second template associated with the second sub-partition;
  deriving a second LIC parameter set based on the second template associated with the second sub-partition;
  applying the first LIC parameter set on a reference block of the current block to obtain a first prediction block of the current block;
  applying the second LIC parameter set on the reference block of the current block to obtain a second prediction block of the current block; and
  encoding the current block based on the first prediction block and the second prediction block.

18. The method of claim 17, the method further comprising:
  based on determining to enable sub-LIC for the current block, including, in video data, a sub-LIC enablement indicator configured to indicate that sub-LIC is enabled for the current block.

19. The method of claim 17, the method further comprising:
  based on determining to enable sub-LIC for the current block, determining a sub-LIC direction for dividing the current block, wherein the current block is divided into the first sub-partition and the second sub-partition based on the determined sub-LIC direction; and
  including a sub-LIC direction indication configured to indicate the determined sub-LIC direction in video data.

20. The method of claim 17, wherein a first template of the plurality of templates corresponds to a left sub-partition of the current block, and the first template comprises samples neighboring a left border and a top border of the left sub-partition of the current block, and a second template of the plurality of templates corresponds to a right sub-partition of the current block, and the second template comprises samples neighboring a top border of the right sub-partition of the current block.

* * * * *